United States Patent
Yamazaki et al.

(10) Patent No.: US 10,277,763 B2
(45) Date of Patent: Apr. 30, 2019

(54) IMAGE FORMING APPARATUS, SYSTEM, AND METHOD FOR PERFORMING PROCESSING IN A DEVICE USING ELECTRICAL POWER SUPPLIED FROM A COMMERCIAL POWER SUPPLY, A FIRST ELECTRICAL POWER STORAGE DEVICE AND A SECOND ELECTRICAL POWER STORAGE DEVICE, THE SECOND ELECTRICAL POWER STORAGE DEVICE HAVING A CAPACITY SMALLER THAN THAT OF THE FIRST ELECTRICAL POWER STORAGE DEVICE

(71) Applicants: Masataka Yamazaki, Kanagawa (JP); Jun Kimura, Tokyo (JP)

(72) Inventors: Masataka Yamazaki, Kanagawa (JP); Jun Kimura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 14 days.

(21) Appl. No.: 15/706,948

(22) Filed: Sep. 18, 2017

(65) Prior Publication Data
US 2018/0084127 A1 Mar. 22, 2018

(30) Foreign Application Priority Data

Sep. 20, 2016 (JP) ................................ 2016-183346
Sep. 20, 2016 (JP) ................................ 2016-183347
Jul. 28, 2017 (JP) ................................ 2017-147134

(51) Int. Cl.
*H04N 1/00* (2006.01)
*H02J 7/00* (2006.01)
(Continued)

(52) U.S. Cl.
CPC ....... *H04N 1/00893* (2013.01); *H02J 7/0052* (2013.01); *H02J 7/0068* (2013.01);
(Continued)

(58) Field of Classification Search
None
See application file for complete search history.

(56) References Cited

U.S. PATENT DOCUMENTS 9,177,235 B2 * 11/2015 Nakano ............... G06K 15/4055
9,277,078 B2 * 3/2016 Yanagawa ............... G06F 1/263
(Continued)

FOREIGN PATENT DOCUMENTS

| CN | 103135458 A | 6/2013 |
|---|---|---|
| JP | 2008-070429 | 3/2008 |
| JP | 2013-168869 | 8/2013 |

OTHER PUBLICATIONS

Chinese Office Action issued Dec. 28. 2018 in Chinese Application No. 2017108475835, citing document AA and AO therein, 5 pages.

*Primary Examiner* — Paul F Payer
(74) *Attorney, Agent, or Firm* — Oblon, McClelland, Maier & Neustadt, L.L.P.

(57) ABSTRACT

An image forming apparatus, includes an image processing device to perform processing, using electrical power supplied from a supply source, the supply source being selected from a commercial power supply, a first electrical power storage device, and a second electrical power storage device, the second electric power supply storage device supplying electric power in an amount smaller than an amount supplied from the first electric power supply storage device; and circuitry to control the processing to be performed by the image processing device according to the selected supply source. When the supply source is the first electrical power storage device, the circuitry controls the image processing device to execute processing that is executable when the supply source is the commercial power supply. When the supply source is the second electrical power storage device, the circuitry controls the image processing device to execute a part of the processing that is executable when the supply source is the commercial power supply.

14 Claims, 19 Drawing Sheets

(51) Int. Cl.
*H02J 7/02* (2016.01)
*G03G 15/00* (2006.01)
*H02J 9/06* (2006.01)

(52) U.S. Cl.
CPC ........... *H02J 7/02* (2013.01); *H04N 1/00891* (2013.01); *G03G 15/5004* (2013.01); *G03G 15/5037* (2013.01); *G03G 15/80* (2013.01); *H02J 9/06* (2013.01); *H04N 1/00904* (2013.01); *H04N 2201/0093* (2013.01)

(56) References Cited

U.S. PATENT DOCUMENTS

| | | |
|---|---|---|
| 9,407,113 B2 * | 8/2016 | Tanaka .................... H02J 9/04 |
| 2008/0068655 A1 | 3/2008 | Kimura |
| 2009/0207443 A1 | 8/2009 | Kimura |
| 2010/0182638 A1 | 7/2010 | Kimura et al. |
| 2011/0063669 A1 | 3/2011 | Kimura |
| 2012/0224209 A1 | 9/2012 | Kimura |
| 2013/0128313 A1 | 5/2013 | Hirokawa et al. |
| 2013/0214603 A1 | 8/2013 | Tanaka |
| 2014/0340699 A1 | 11/2014 | Nakano |
| 2015/0124281 A1 | 5/2015 | Watanabe et al. |

\* cited by examiner

FIG. 4A

| SUPPLY SOURCE | OPERATION |
|---|---|
| COMMERCIAL POWER SUPPLY | RECEPTION, PRINT, AND STORAGE OF FAX DATA, AND DELETION OF RECEIVED DATA |
| FIRST ELECTRICAL STORAGE DEVICE | |
| SECOND ELECTRICAL STORAGE DEVICE | RECEPTION AND STORAGE OF FAX DATA |

FIG. 4B

| SUPPLY SOURCE | OPERATION |
|---|---|
| COMMERCIAL POWER SUPPLY | RECEPTION OF PRINT JOB, PRINT OF PRINT DATA, AND STORAGE OF PRINT JOB |
| FIRST ELECTRICAL STORAGE DEVICE | |
| SECOND ELECTRICAL STORAGE DEVICE | BLOCK OF PRINT JOB |

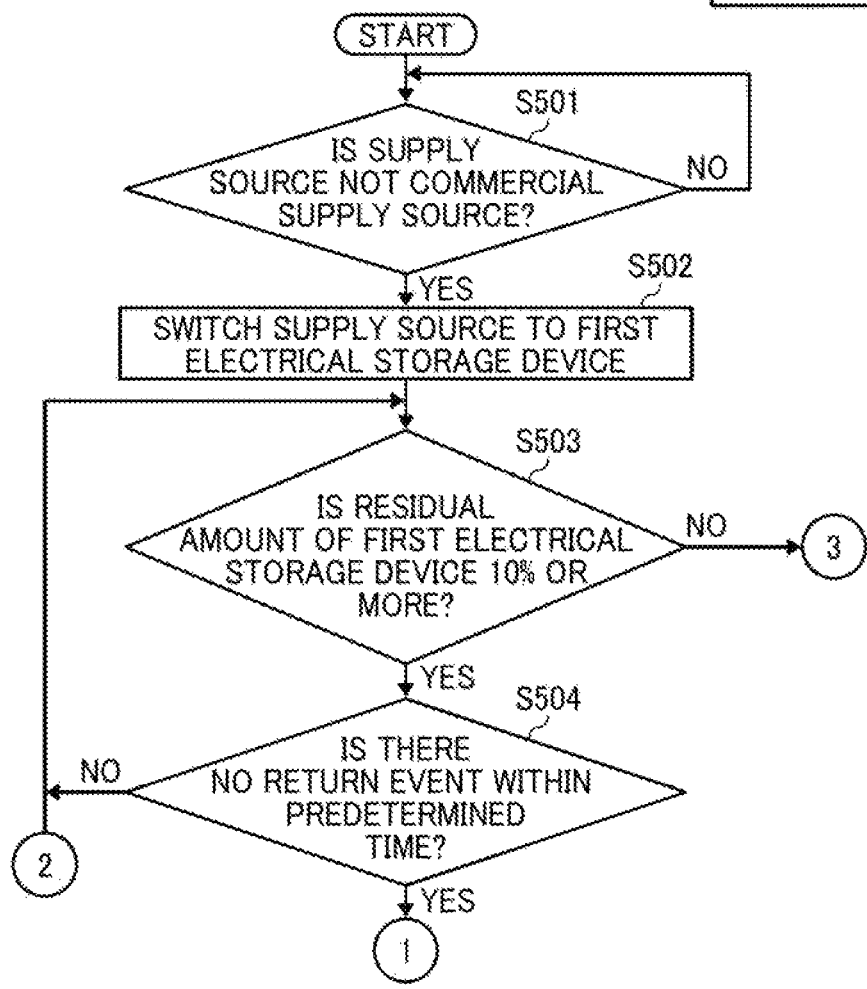

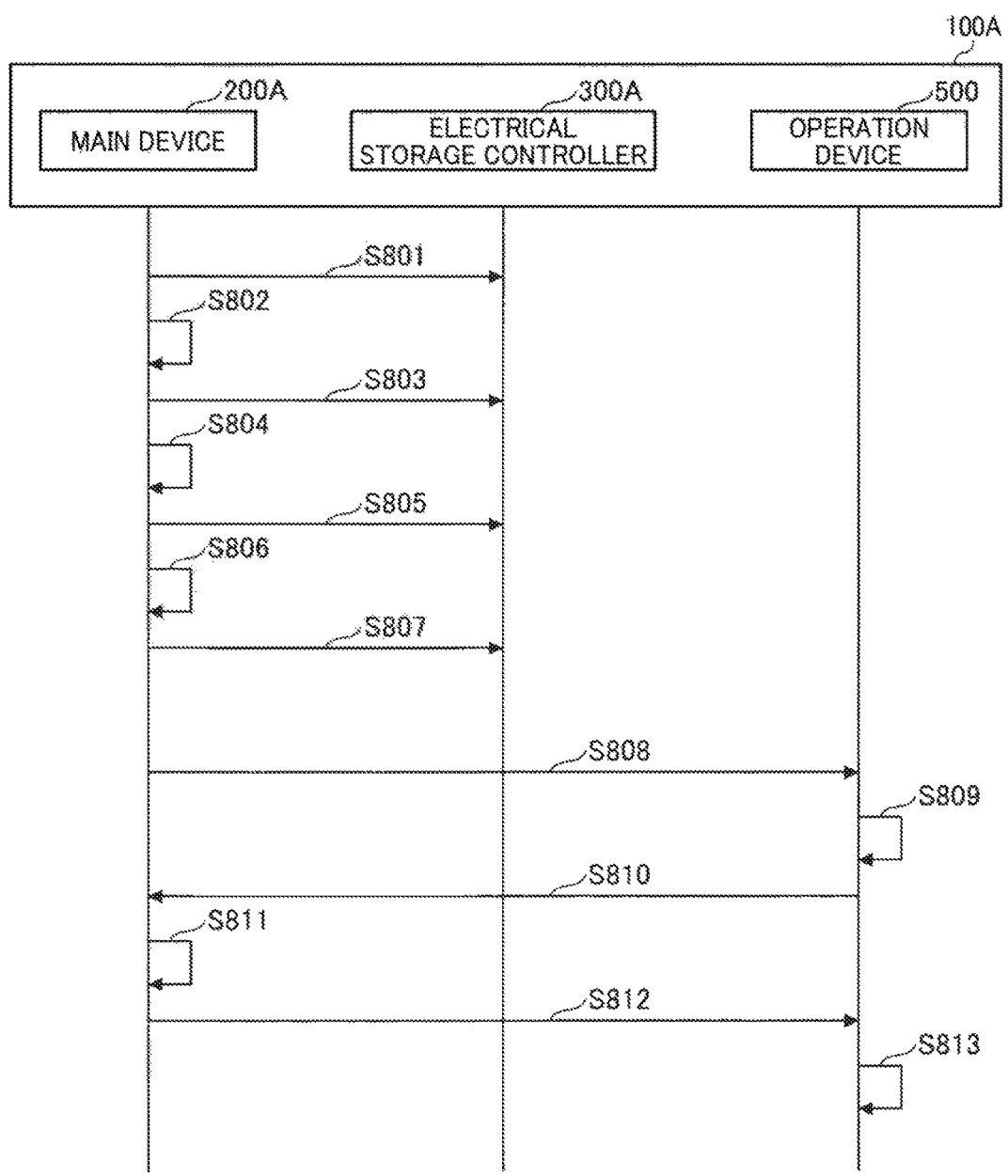

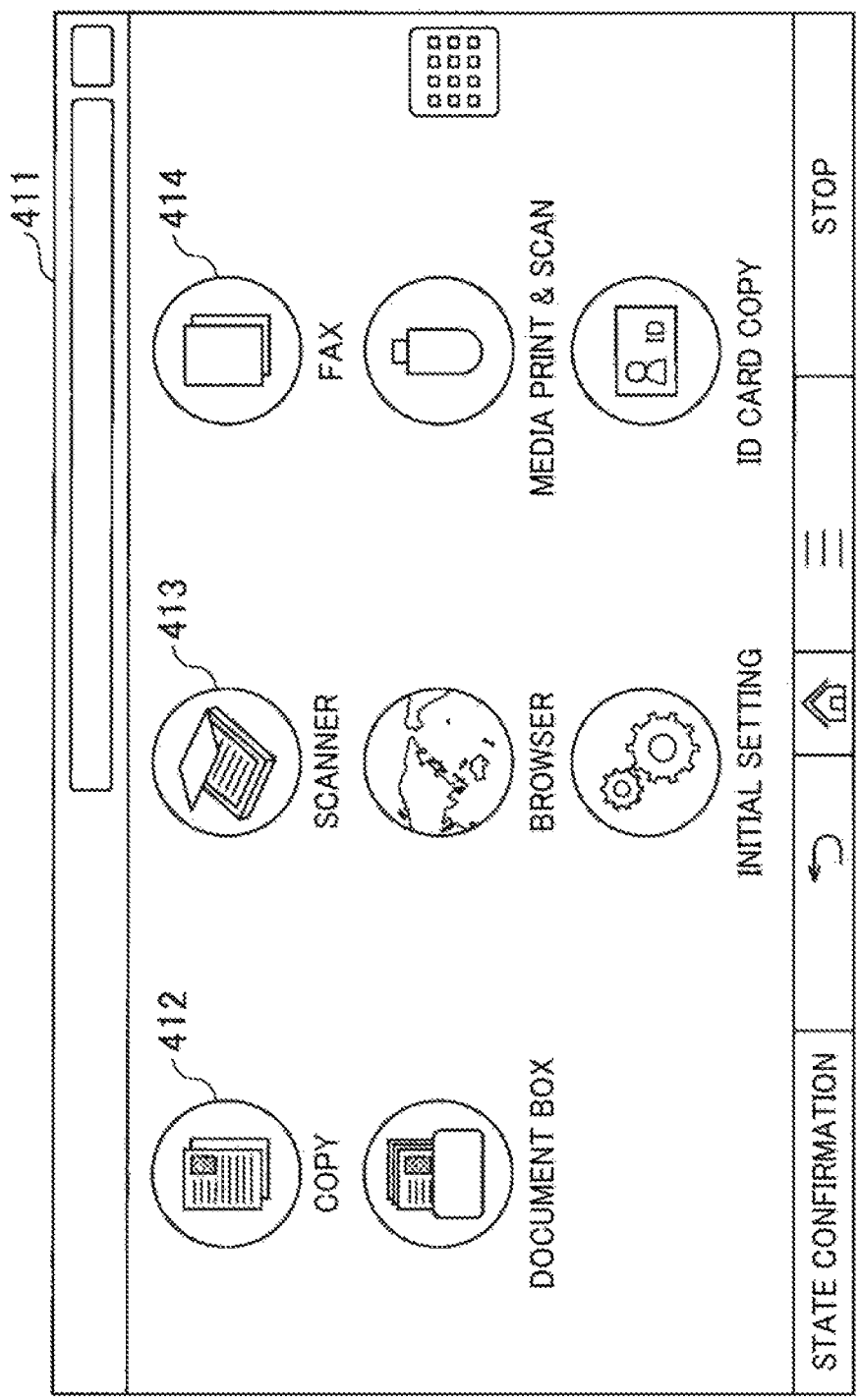

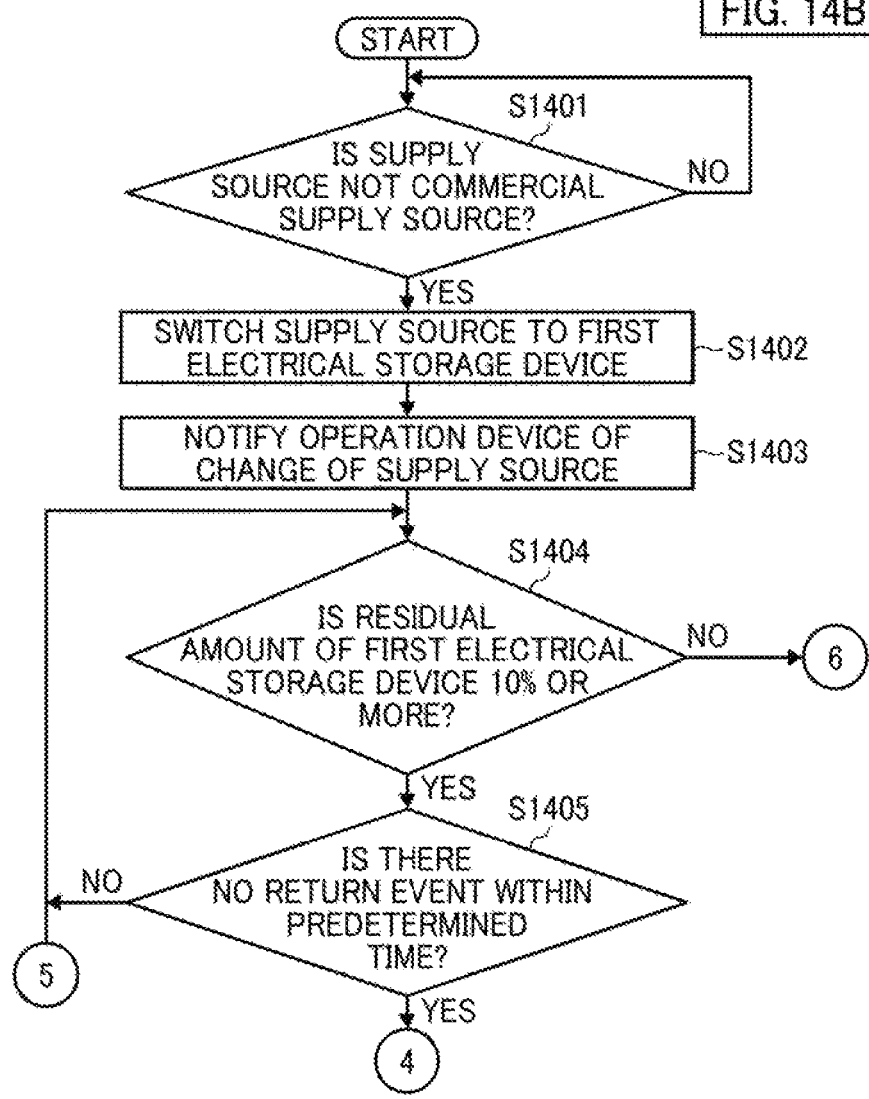

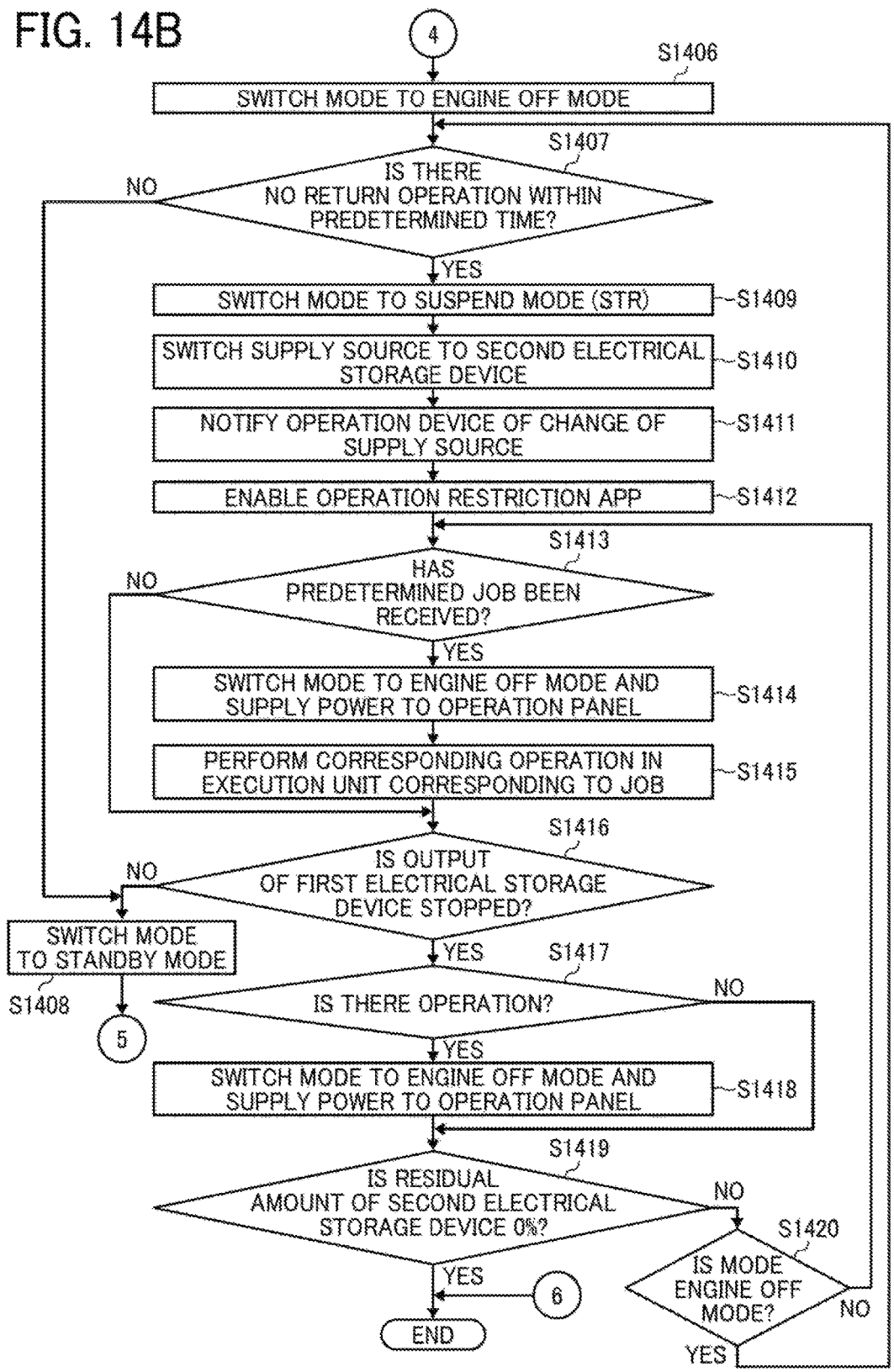

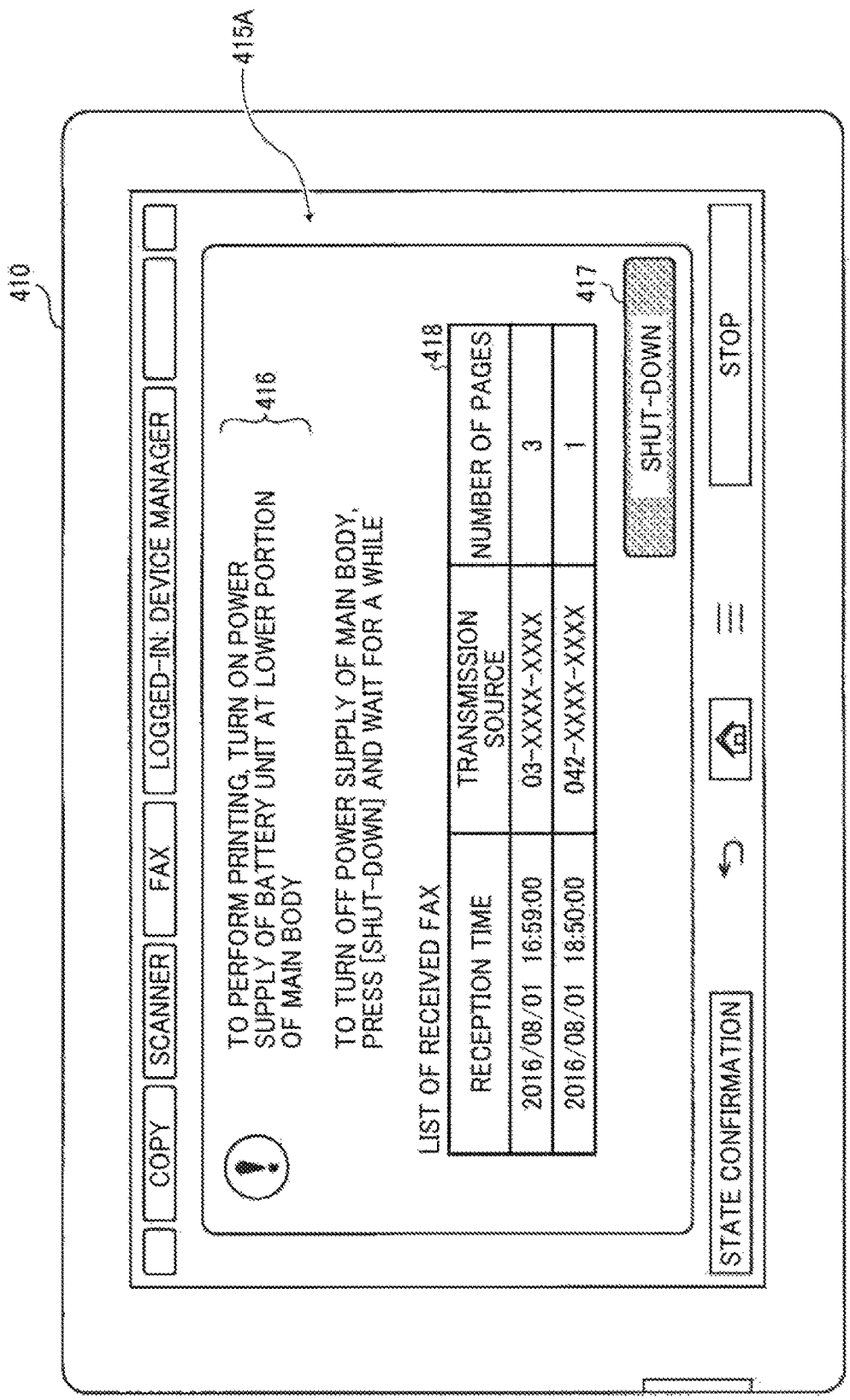

IMAGE FORMING APPARATUS, SYSTEM, AND METHOD FOR PERFORMING PROCESSING IN A DEVICE USING ELECTRICAL POWER SUPPLIED FROM A COMMERCIAL POWER SUPPLY, A FIRST ELECTRICAL POWER STORAGE DEVICE AND A SECOND ELECTRICAL POWER STORAGE DEVICE, THE SECOND ELECTRICAL POWER STORAGE DEVICE HAVING A CAPACITY SMALLER THAN THAT OF THE FIRST ELECTRICAL POWER STORAGE DEVICE

CROSS-REFERENCE TO RELATED APPLICATIONS

This patent application is based on and claims priority pursuant to 35 U.S.C. § 119(a) to Japanese Patent Application Nos. 2016-183346, filed on Sep. 20, 2016, 2016-183347, filed on Sep. 20, 2016, and 2017-147134, filed on Jul. 28, 2017, in the Japan Patent Office, the entire disclosure of which is hereby incorporated by reference herein.

BACKGROUND

Technical Field

The present invention relates to an image forming apparatus, an image forming system, and an image forming method.

Description of the Related Art

Conventionally, image forming apparatuses including an electrical power storage unit capable of charging and discharging are known. In the image forming apparatuses, power is supplied from a capacitor as the electrical power storage unit when supply of power from an alternating current (AC) power supply is stopped.

The conventional image forming apparatuses are similarly operated when the power is supplied from the electrical power storage unit to a case where the power is supplied from the AC power supply. Therefore, there is a possibility that a function that is of high importance and needs to be operated on a constant basis, such as reception of a facsimile (fax), may not be able to be used due to consumption of the power stored in the electrical power storage unit in a short time.

SUMMARY

An image forming apparatus includes: an image processing device to perform processing, using electrical power supplied from a supply source, the supply source being selected from a commercial power supply, a first electrical power storage device, and a second electrical power storage device, the second electric power supply storage device supplying electric power in an amount smaller than an amount supplied from the first electric power supply storage device; and circuitry to control the processing to be performed by the image processing device according to the selected supply source. When the supply source is the first electrical power storage device, the circuitry controls the image processing device to execute processing that is executable when the supply source is the commercial power supply. When the supply source is the second electrical power storage device, the circuitry controls the image processing device to execute a part of the processing that is executable when the supply source is the commercial power supply.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 4A and 4B are diagrams illustrating examples of tables held by a facsimile (fax) execution unit and a print execution unit of the first embodiment;

FIGS. 5A and 5B (FIG. 5) are a flowchart illustrating an operation of the image forming apparatus of the first embodiment;

FIG. 8 is a sequence diagram illustrating an operation of the image forming apparatus of when an operation restriction screen is displayed, of the second embodiment;

FIGS. 9A and 9B are views illustrating examples of screens displayed on an operation panel of the second embodiment;

FIGS. 14A and 14B (FIG. 14) are a flowchart illustrating an operation of the image forming apparatus of the second embodiment;

FIG. 16 is a view illustrating an example of a screen displayed on the operation panel of the second embodiment.

Figure 1:
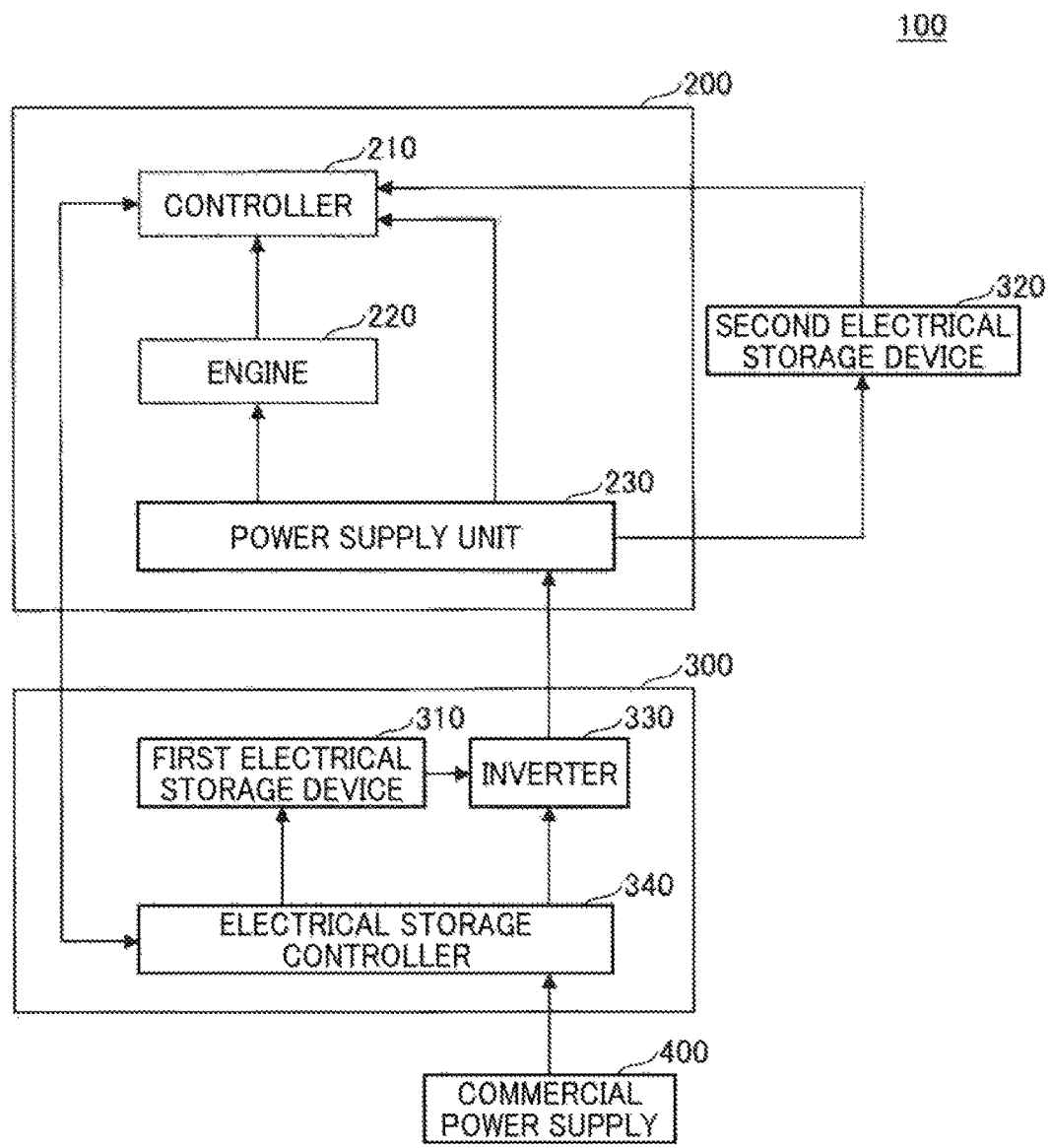
FIG. 1 is a diagram illustrating an outline of a configuration of an image forming apparatus of a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural terms as well, unless the content clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

<First Embodiment>

Embodiments will be described below referring to the drawings. FIG. 1 is a diagram illustrating an outline of a configuration of an image forming apparatus of a first embodiment.

An image forming apparatus 100 of the present embodiment includes a main device 200 and an electrical power storage device 300. In other words, the image forming apparatus 100 of the present embodiment is an image forming system including the mam device 200 and the electrical power storage device 300. The main device 200 is supplied power Through the electrical power storage device 300.

The main device 200 of the present embodiment includes a controller 210, an engine 220, and a power supply unit 230, and executes various jobs received by the image forming apparatus 100. The various jobs are print of data transmitted to the image forming apparatus 100, scan or copy of a document, transmission or reception of a facsimile (fax), and the like.

The controller 210 of the present embodiment includes an arithmetic processing unit and a memory. The controller 210 controls the engine 220 to realize various functions of the image forming apparatus 100. Further, the controller 210 notifies the electrical power storage device 300 of a state of the image forming apparatus 100, and causes the image forming apparatus 100 to perform an operation corresponding to a supply source of the power (power source).

The engine 220 of the present embodiment includes an image forming unit such as a photoconductor and a fixing device, and forms an image on a recording medium such as a sheet and outputs the recording medium on which the image has been formed, according to an instruction of the controller 210.

The power supply unit 230 of the present embodiment provides the power supplied from the electrical power storage device 300 to the engine 220 and the controller 210.

The electrical power storage device 300 includes a first electrical power storage device 310, a second electrical power storage device 320, an inverter 330, and an electrical power storage controller 540.

The first electrical power storage device 310 and the second electrical power storage device are electrical power storage devices capable of charging and discharging. To be specific, the first electrical power storage device 310 and the second electrical power storage device 320 may be lithium ion batteries or capacitors, for example.

A power supply amount of the first electrical power storage device 310 of the present embodiment is sufficiently larger than a power supply amount of the second electrical power storage device 320 of the present embodiment. To be specific, for example, the power supply amount of the first electrical power storage device 310 may be at least about ten times the power supply amount of the second electrical power storage device 320. For example, in a case where the power supply amount of the first electrical power storage device 310 is about 830 [Wh], the power supply amount of the second electrical power storage device 320 may just be about 163.8 [Wh].

The inverter 330 generates a voltage to be supplied to the controller 210 and a voltage to be supplied to the engine 220, from the power supplied from the power source, and provides the voltages to the main device 200.

The electrical power storage controller 340 switches the power source according to the state of the image forming apparatus 100, the state being notified from the main device 200. Further, the electrical power storage controller 340 monitors residual amounts of the first electrical power storage device 310 and the second electrical power storage device 320.

To be specific, the electrical power storage controller 540 switches the power source from an alternating current (AC) power supply (commercial power supply) 400 to the first electrical power storage device 310 when the image forming apparatus 100 becomes in a state where supply of the power from the commercial power supply 400 is stopped due to power failure or the like. Further, the electrical power storage controller 340 switches the power source from the first electrical power storage device 310 to the second electrical power storage device 320 when the image forming apparatus 100 becomes in a state where a mode becomes a suspend (suspend to RAM (STR)) mode described below in the state where the power is being supplied from the first electrical power storage device 310.

The suspend mode indicates a state where operation, such as a part of operation performed by the controller 210, is temporarily stopped, for example, except that monitoring operation to determine whether there is reception of data such as a fax or a print from a network. In the suspend mode, the power consumption is reduced to the utmost limit, in the image forming apparatus 100. Further, in the suspend mode, when the image forming apparatus 100 receives the data, the image forming apparatus 100 notifies the controller 210 of detection of data and causes the entire controller 210 to wake up.

Further, in the suspend mode, the image forming apparatus 100 of the present embodiment restricts use of a part of the functions of the image forming apparatus 100. In other words, the image forming apparatus 100 of the present embodiment restricts use of a part of the functions of the image forming apparatus 100 in a case where the power source is the second electrical power storage device 320.

Figure 2:
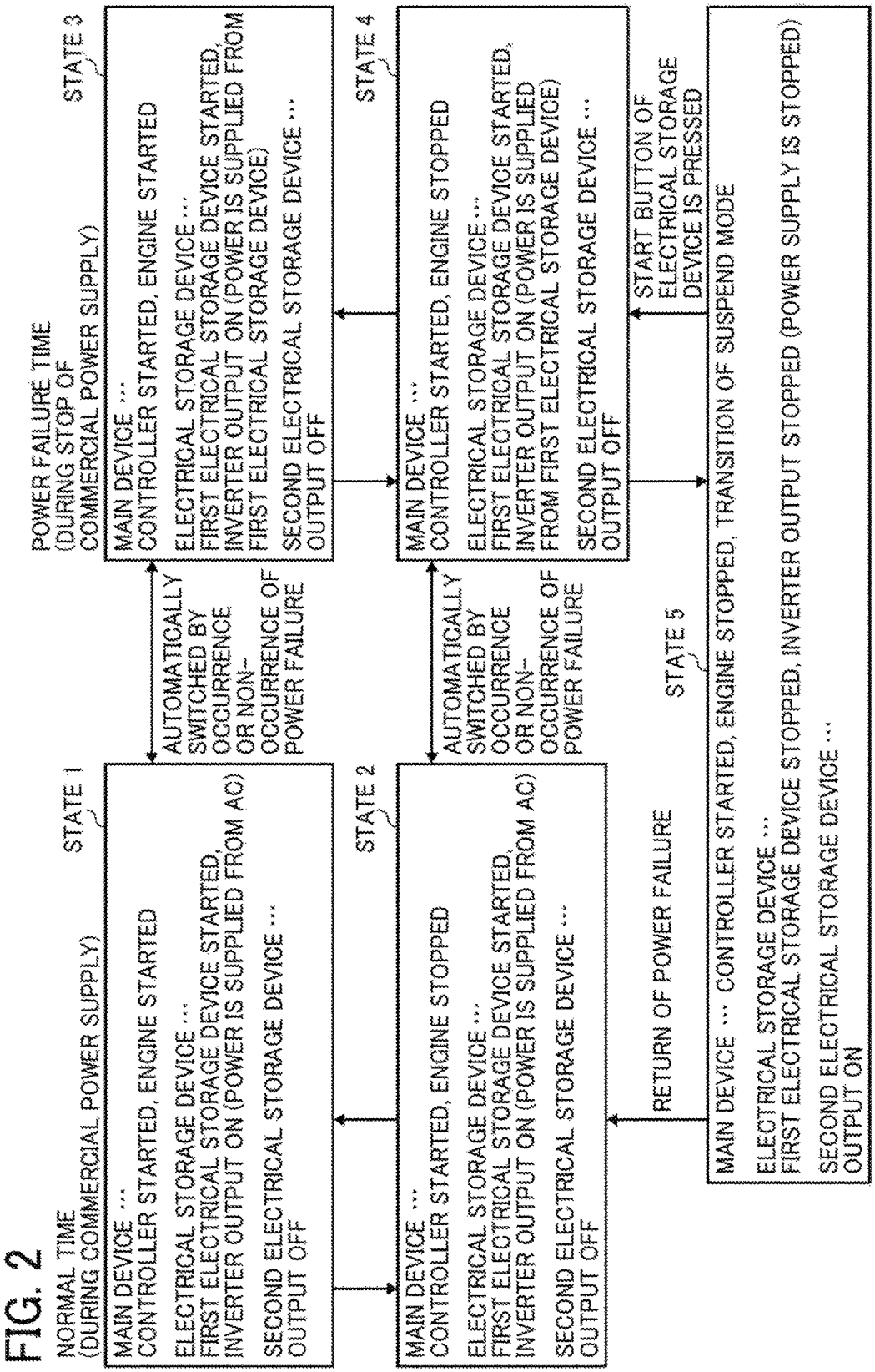
FIG. 2 is a diagram illustrating an operation of the image forming apparatus of the first embodiment.

Hereinafter, an outline of an operation of the image forming apparatus 100 of the present embodiment will be described referring to FIG. 2. FIG. 2 is a diagram illustrating an operation of the image forming apparatus. A mode of the image forming apparatus 100 illustrated in FIG. 2 and the like indicates a state of the image forming apparatus 100.

A state 1 illustrated in FIG. 2 indicates that the power is supplied from the commercial power supply 400 to the image forming apparatus 100, and the image forming apparatus 100 is in a standby mode. The standby mode of the present embodiment indicates a state in which the mode is moved to a job mode to immediately execute a received job when receiving the job. The job mode indicates a state in which the received job is being executed.

In the state 1, the controller 210 and the engine 220 are being started in the main device 200 of the image forming apparatus 100. In other words, in the state 1, the power of the commercial power supply 400 is supplied to the controller 210 and the engine 220.

Further, in the state 1, the electrical power storage device 300 of the image forming apparatus 100 outputs the power supplied from the commercial power supply 400, and does not allow the first electrical power storage device 310 and the second electrical power storage device 320 to output the power (output OFF).

A state 2 illustrated in FIG. 2 indicates that the power is supplied from the commercial power supply 400 to the image forming apparatus 100, and the image forming apparatus 100 is in an engine off mode. The engine off mode of the present embodiment indicates a state in which the supply of the power to the engine 220 of the main device 200 is stopped, a job (print job) is not executed, and at least reception and storage of data such as a fax or a print are performed. Note that the controller 210 has been started in the engine off mode.

In other words, the engine off mode of the present embodiment is an energy saving mode to reduce the power consumption. The engine off mode of the present embodiment has a case, where the supply source of the power is the first electrical power storage device 310 and a case where the supply source of the power is the second electrical power storage device 320.

The image forming apparatus 100 of the present embodiment is transitioned from the standby mode of the state 1 to the engine off mode of the state 2 when an operation has not been performed for a predetermined time in the state 1. Further, the image forming apparatus 100 of the present embodiment is transitioned to the standby mode of the state 1 and performs execution of the job or processing according to the operation when the image forming apparatus 100 receives the job or the operation in the engine off mode of the state 2.

In the state 2, the controller 210 has been started and the operation of the engine 220 is stopped in the main device 200 of the image forming apparatus 100. In other words, in the state 2, the power of the commercial power supply 400 is supplied to the controller 210 but the power is not supplied to the engine 220.

Further, in the state 2, the electrical power storage device 300 of the image forming apparatus 100 stops the output of the voltage to be supplied to the engine 220 and supplies the power from the commercial power supply 400 to the controller 210. Further, the electrical power storage device 300 in the state 2 does not allow the first electrical power storage device 310 and the second electrical power storage device 320 to output the power (output OFF).

In the present embodiment, in the state 1 and the state 2, the first electrical power storage device 310 and the second electrical power storage device 320 may be charged with the power supplied from the commercial power supply 400. Further, in the present embodiment, when the power supply is performed from the commercial power supply or the first electrical power storage device 310 to the image forming apparatus 100, the power supply may go through the second electrical power storage device 320 to charge the second electrical power storage device 320.

The above is the operation of when the power is supplied from the commercial power supply 400 to the image forming apparatus 100.

Next, a case where the power is not supplied from the commercial power supply 400 to the image forming apparatus 100 will be described. The case where the power is not supplied from the commercial power supply 400 is a case of power failure, a case where a power plug is pulled out, or the like. In FIG. 2, the state 3 to the state 5 are the cases where no power is supplied from the commercial power supply 400.

In the present embodiment, the controller 210 of the main device 200 determines existence or non-existence of the supply of the power from the commercial power supply 400, and switches the supply source of the power from the commercial power supply 400 to the first electrical power storage device 310 when determining that the supply of the power from the commercial power supply 400 is stopped.

A state 3 indicates that the power is supplied from the first electrical power storage device 310 to the image forming apparatus 100, and the image forming apparatus 100 is in the standby mode.

In the state 3, the controller 210 and the engine 220 have been started in the main device 200 of the image forming apparatus 100. In other words, in the state 3, the power of the first electrical power storage device 310 is supplied to the controller 210 and the engine 220.

Further, in the state 3, the electrical power storage device 300 of the image forming apparatus 100 outputs the power supplied from the first electrical power storage device 310, and does not allow the second electrical power storage device 320 to output the power (output OFF).

The image forming apparatus 100 is transitioned from the standby mode of the state 3 to the engine off mode of a state 4 when an operation has not been performed for a predetermined time in the state 3.

The state 4 illustrated in FIG. 2 indicates a state in which the power is supplied from the first electrical power storage device 310 to the image forming apparatus 100, and the image forming apparatus 100 is in the engine off mode.

In the state 4, the controller 210 has been started and the operation of the engine 220 is stopped in the main device 200 of the image forming apparatus 100. In other words, in the state 4, the power of the first electrical power storage device 310 is supplied to the controller 210 but the power is not supplied to the engine 220.

Further, in the state 4, the electrical power storage device 300 of the image forming apparatus 190 stops the output of the voltage to be supplied to the engine 220. Note that the controller 210 is supplied the power from the first electrical power storage device 310. Further, the second electrical power storage device 320 is not allowed to output the power (output OFF).

Further, the image forming apparatus 100 is transitioned to the standby mode of the state 3 and performs execution of the job or processing according to the operation when the image forming apparatus 100 receives the job or the operation in the engine off mode of the state 4. For example, in the engine off mode of the state 4, the image forming apparatus 100 is transitioned to the standby mode of the state 3 and executes a fax print job when the image forming apparatus 100 receives a fax. That is, in the state 3 and the state 4 using the first electrical power storage device 310 as the power source, the operation of the image forming apparatus 100 is the same as the case where the power is supplied from the commercial power supply 400. In other words, in the present embodiment, in the state 3 and the state 4 using the first electrical power storage device 310 as the power source, an image processing device 295 executes the same processing as the case where the power is supplied from the commercial power supply 400.

Further, the image forming apparatus 100 switches the supply source of the power from the first electrical power storage device 310 to the commercial power supply 400 and is transitioned to the state 1 or 2 when the supply of the power from the commercial power supply 400 is resumed in the state 3 or 4.

In the state 4, when an operation is not further performed for a predetermined time, the image forming apparatus 100 is transitioned from the engine off mode to the suspend mode, and switches the supply source of the power from the first electrical power storage device 310 to the second electrical power storage device 320.

The state 5 indicates a state in which the power is supplied from the second electrical power storage device 320 to the image forming apparatus 100, and the image forming apparatus 100 is in the suspend mode or in the engine off mode.

In a state 5, the controller 210 has been started and the operation of the engine 220 is stopped in the main device 200 of the image forming apparatus 100. In other words, in the state 5, the power of the second electrical power storage device 320 is supplied to the controller 210 but the power is not supplied to the engine 220. Further, in the state 5, the electrical power storage device 300 of the image forming apparatus 100 stops the output of the voltage to be supplied to the engine 220. Further, when the mode is switched to the suspend mode of the state 5, the image forming apparatus 100 restricts use of the functions other than reception of a predetermined job.

The image forming apparatus 100 of the present embodiment is transitioned to the state 3 when the image forming apparatus 100 receives an operation to resume the output from the first electrical power storage device 310 in the suspend mode of the state 5. Further, in the suspend mode of the state 5, the image forming apparatus 100 is transitioned to the state 2 when the supply of the power from the commercial 1 power supply 400 is resumed.

Further, when the image forming apparatus 100 receives a predetermined job in the suspend mode of the state the image forming apparatus 100 is transitioned to the engine off mode while maintaining the second electrical power storage device 320 as the supply source of the power and performs processing according to the job. The predetermined job is reception of a fax, reception of a print job through a network, or the like. In other words, the predetermined job is a job to receive data from an outside of the image forming apparatus 100.

As described above, in the present embodiment, the state of the image forming apparatus 100 is transitioned from the suspend mode to the engine mode in the state 5 where the supply source of the power is the second electrical power storage device 320.

For example, when the image forming apparatus 100 receives a fax document in the suspend mode of the state 5, the image forming apparatus 100 executes processing of accumulating the received fax documents and processing of lighting a delayed delivery lamp as the processing according to the job. Here, to print the accumulated fax document, there can be a method for automatically printing all the accumulated fax documents when the engine 220 is booted, and a method for printing the fax document selected by a user.

Details of the processing according to the predetermined job will be described below.

As described above, the image forming apparatus 100 of the present embodiment is provided with the suspend mode in addition to the standby mode and the engine off mode in a case where the supply source of the power is not the commercial power supply 400. The image forming apparatus 100 prohibits use of the functions other than reception of a predetermined job, switches the supply source of the power to the second electrical power storage device 320, and stops the output from the first electrical power storage device 310, when the image forming apparatus 100 is transitioned to the suspend mode.

Therefore, according to the present embodiment, the time to operate the image forming apparatus 100 by the power of the first electrical power storage device 310 can be shortened, and consumption of the power from the first electrical power storage device 310 can be suppressed.

Further, in the present embodiment, the second electrical power storage device 320 can be used as the supply source of the power for performing an operation to receive data from an outside. Therefore, for example, even when the supply of the power from the commercial power supply 400 is stopped and the first electrical power storage device 310 becomes the supply source of the power, the power from first electrical power storage device 310 is not consumed to perform the operation to receive data from an outside.

Therefore, according to the present embodiment, when the first electrical power storage device 310 becomes the supply source of the power, the function that is of high importance and needs to be operated on a constant basis, such as reception of data transmitted from an outside, can be realized over a long period of time. To be specific, in the present embodiment, the second electrical power storage device 320 is provided. Therefore, when the supply source of the power is the first electrical power storage device 310, and the mode is the engine off mode, operations such as start of the controller 210, reception of a fax, and accumulation of a received fax document can be performed for a long time.

The image forming apparatus 100 of the present embodiment realizes the above-described control by control of the controller 210 of the main device 200 and the electrical power storage controller 340 of the electrical power storage device 300.

Figure 3:
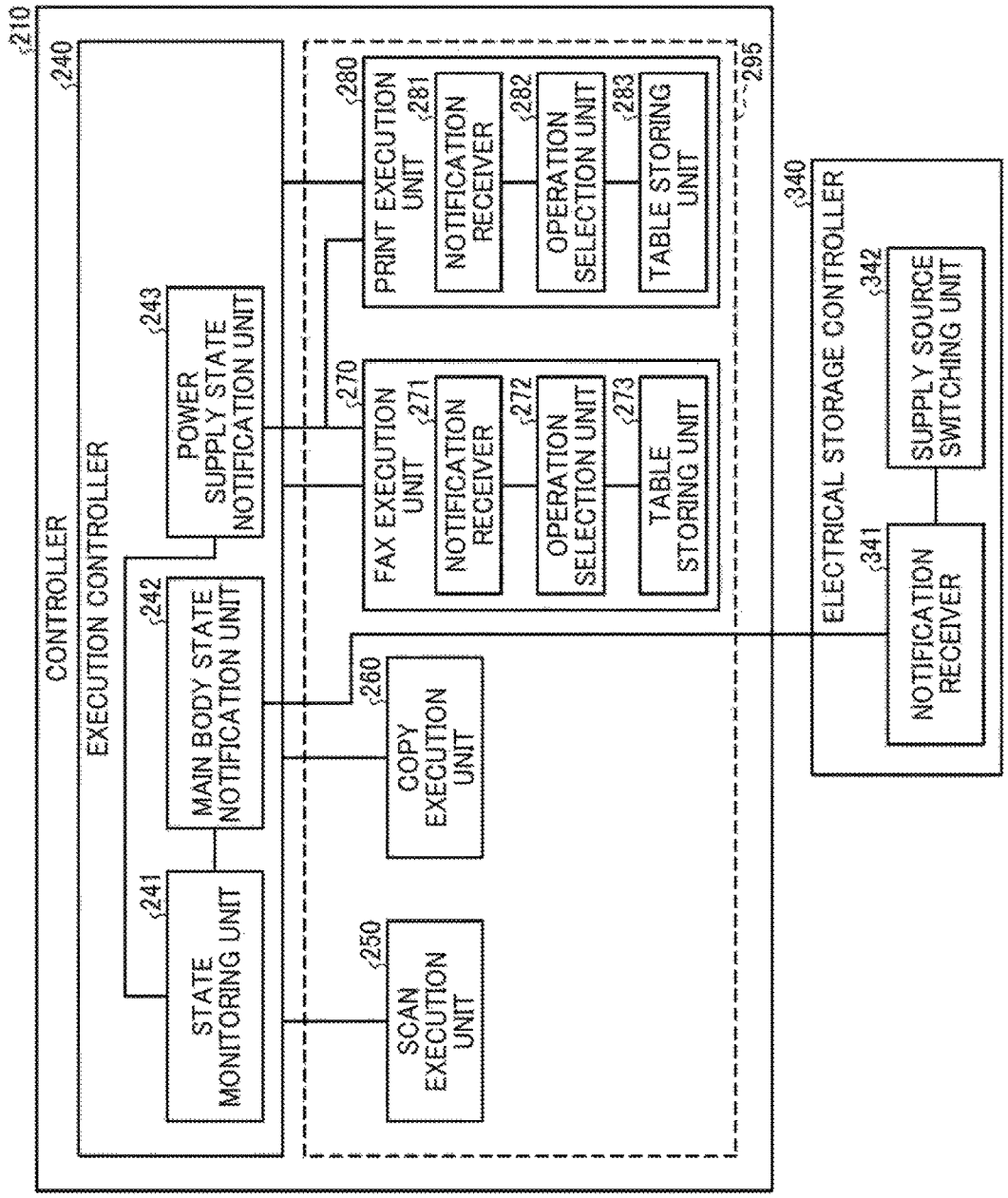
FIG. 3 is a diagram illustrating functions of a controller and an electrical power storage controller of an electrical power storage device of the image forming apparatus of the first embodiment.

Hereinafter, functions of the controller 210 and the electrical power storage controller 340 of the present embodiment will be described. FIG. 3 is a diagram illustrating functions of the controller and the electrical power storage controller of the electrical power storage device of the image forming apparatus;

First, functions of the controller 210 of the present embodiment will be described. The controller 210 of the present embodiment includes an execution controller 240, a scan execution unit 250, a copy execution unit 260, a fax execution unit 270, and a print execution unit 280. The scan execution unit 250, the copy execution unit 260, the fax execution unit 270, and the print execution unit 280 of the present embodiment form the image processing device 295. The image processing device 295 receives the supply of the power from any one of the commercial power supply 400, the first electrical power storage device 310, and the second electrical power storage device 320.

The execution controller 240 controls execution of the job received by the controller 210. Further, the execution controller 240 operates the image forming apparatus 100 in the mode according to the state of the image forming apparatus 100. Further, the execution controller 240 of the present embodiment causes the fax execution unit 270 and the print execution unit 280 to execute processing according to the supply source of the power of the image forming apparatus 100. That is, the execution controller 240 of the present embodiment is a controller that controls the image processing device 295.

The scan execution unit 250, the copy execution unit 260, the fax execution unit 270, and the print execution unit 280 of the present embodiment respectively correspond to the functions of the image forming apparatus 100 and realize the corresponding functions. Note that the execution units illustrated in FIG. 3 are examples, and the functions of the image forming apparatus 100 are not limited the examples. The image forming apparatus 100 may have a function other than the functions realized by the execution units illustrated in FIG. 3 or may have a part of the functions realized by the execution units illustrated in FIG. 3.

The scan execution unit 250 controls the engine 220 to realize a scan function to scan a document and the like. The copy execution unit 260 controls the engine 220 to realize a copy function to print and output input image data.

The fax execution unit 270 controls the engine 220 to realize a fax reception function to print and output received fax data and a fax transmission function to read a document and transmit the read document to a destination as fax data. Further, the fax execution unit 270 of the present embodiment performs processing according to the supply source of the power notified from the execution controller 240.

The print execution unit 280 realizes a print function to execute a print job received through a network or the like connected with the image forming apparatus 100. Further, the print execution unit 280 of the present embodiment performs processing according to the supply source of the power notified from the execution controller 240.

Details of the fax execution unit 270 and the print execution unit 280 will be described below.

The execution controller 240 of the present embodiment includes a state monitoring unit 241, a main body state notification unit 242, and a power supply state notification unit 243.

The state monitoring unit 241 monitors the state of the image forming apparatus 100. To be specific, the state monitoring unit 241 inquires of the electrical power storage controller 340 about the supply source of the power and monitors the supply source of the power.

Further, the state monitoring unit 241 monitors the mode of the operation of the image forming apparatus 100, an operation instruction to the image forming apparatus 100, and existence or non-existence of a job. The state monitoring unit 241 then notifies the main body state notification unit 242 of the mode of the operation of the image forming apparatus 100. Further, when the supply source of the power is changed, the state monitoring unit 241 notifies the power supply state notification unit 243 of content of the change and notification of the change.

The main body state notification unit 242 notifies the electrical power storage controller 340 of the supply source of the power corresponding to the mode after the change and a change instruction of the supply source, in response to the notification indicating the change of the mode of the operation from the state monitoring unit 241.

The power supply state notification unit 243 notifies the fax execution unit 270 and the print execution unit 280 of the content of the change and the notification of the change when notified of the change of the supply source of the power from the state monitoring unit 241. Note that the power supply state notification unit 243 of the present embodiment may have a notification destination of the change of the supply source of the power set in advance. In other words, the power supply state notification unit 243 may have the fax execution unit 270 and the print execution unit 280 set as the notification destinations of the change of the supply source of the power.

The fax execution unit 270 of the present embodiment includes a notification receiver 271, an operation selection unit 272, and a table storing unit 273.

The notification receiver 271 receives the notification of the change of the supply source of the power from the power supply state notification unit 243. The operation selection unit 272 refers to a table held in the table storing unit 273, and selects an operation corresponding to the supply source of the power. The table storing unit 273 holds a table in which the supply source of the power and the operation of the fax execution unit 270 are associated with each other.

The print execution unit 280 of the present embodiment includes a notification receiver 281, an operation selection unit 282, and a table storing unit 283.

The notification receiver 281 receives the notification of the change of the supply source of the power from the power supply state notification unit 243. The operation selection unit 282 refers to a table held in the table storing unit 283, and selects an operation corresponding to the supply source of the power. The table storing unit 283 holds a table in which the supply source of the power and the operation of the prim execution unit 280 are associated with each other. Details of the tables held in the table storing units 273 and 283 will be described below.

Here, the reason that the fax execution unit 270 and the print execution unit 280 are set to the notification destinations of the change of the supply source of the power will be described.

The fax execution unit 270 has a possibility of reception of fax data regardless of existence or non-existence of the supply of the power from the commercial power supply 400 to the image forming apparatus 100.

Typically, the fax execution unit 270 outputs the tax data by the engine 220 when receiving the fax data. In a case where the image forming apparatus 100 is in the suspend mode, the power supply to the engine 220 is slopped and the fax execution unit 270 cannot output the fax data.

Therefore, in the present embodiment, the fax execution unit 270 can store the received fax data when receiving the fax data in the state where the image forming apparatus 100 is in the suspend mode.

The image forming apparatus 100 outputs the stored fax data when receiving an operation of an output after the supply of the power by the commercial power supply 400 is resumed.

With the configuration, in the present embodiment, the image forming apparatus 100 can receives the fax even when the image forming apparatus 100 is in the suspend mode due to power failure or the like. Further, in the present embodiment, the stored fax data is output after the supply of the power by the commercial power supply 400 is resumed. Therefore, the power of the first electrical power storage device 310 and the second electrical power storage device 320 is not consumed for the output of the fax data. Therefore, according to the present embodiment, the consumption of the power stored in an electrical power storage unit can be suppressed.

Similarly, the print execution unit 280 has a possibility of reception of a print job regardless of existence or non-existence of the supply of the power from the commercial power supply 400 to the image forming apparatus 100.

Typically, the print execution unit 280 outputs the print data included in the print job by the engine 220 when receiving the print job. However, in a case where the image forming apparatus 100 is in the suspend mode, the power supply to the engine 220 is stopped, and thus the print execution unit 280 cannot output the print data. When the print execution unit 280 tries to execute the received print job in the above state, appropriate processing may not be performed.

Therefore, in the present embodiment, the image forming apparatus 100 prohibits (blocks) execution of the print data included in the print job when receiving the print job in the suspend mode. Note that the prohibition of execution of the print job of the present embodiment may be processing of notifying a transmission source of a state where the print job is not executable without executing the print job, for example. Further, the prohibition of execution of the print job may be processing of notifying the transmission source of the print job of a transmission error of the print job.

With the configuration, in the present embodiment, the consumption of the power of the first electrical power storage device 310 and the second electrical power storage device 320 by the output of the print data can be suppressed in a case where the supply of the commercial power supply 400 to the image forming apparatus 100 is not performed due to power failure or the like.

The scan execution unit 250 and the copy execution unit 260 of the present embodiment perform similar operations even in a case where the supply source of the power is the commercial power supply 400 or a case where the supply scene of the power is the first electrical power storage device 310. Further, the scan execution unit 250 and the copy execution unit 260 are not operated in a case where the supply source of the power is the second electrical power storage device 320 because the operation of the engine 220 is stopped. Therefore, in the present embodiment, the change of the supply source of the power is not notified to the scan execution unit 250 and the copy execution unit 260. However, the supply source of the power may be notified to the scan execution unit 250 and the copy execution unit 260.

Next, the electrical power storage controller 340 of the electrical power storage device 300 will be described. The electrical power storage controller 340 of the present embodiment includes a notification receiver 341 and a supply source switching unit 342.

The notification receiver 341 receives notification from the main body state notification unit 242 of the execution controller 240. The supply source switching unit 342 switches the supply source of the power according to content of the notification received by the notification receiver 341.

Next, the tables held by the table storing units of the fax execution unit 270 and the print execution unit 280 will be described referring to FIGS 4A and 4B.

FIGS. 4A and 48 are diagrams illustrating examples of tables held by the fax, execution unit and the print execution unit. FIG. 4A illustrates an example of a table 41 held by the table storing unit 273 of the fax execution unit 270 and FIG. 4B illustrates an example of a table 42 held by the table storing unit 283 of the print execution unit 280.

Tables 41 and 42 of the present embodiment include the supply sources and operations as items of information. A value of the item "supply source" indicates the supply source of the power to the image forming apparatus 100. A value of the item "operation" indicates an operation of the fax execution unit 270 or the print execution unit 280.

According to the table 41, it can be seen that the operations of the fax execution unit 270 corresponding to the commercial power supply 400 and the first electrical power storage device 310 as the supply sources are reception, print, storage, and deletion of the fax data. Further, according to the table 41, it can be seen that the operations of the fax execution unit 270 corresponding to the second electrical power storage device 320 are reception and storage of the fax data.

Further, according to the table 42, it can be seen that the operations of the print execution unit 280 corresponding to the commercial power supply 400 and the first electrical power storage device 310 as the supply sources are reception of the print job, print of the print data included in the print job, and storage of the print job. In other words, it can be seen that the operations of the print execution unit 280 corresponding to the commercial power supply 400 and the first electrical power storage device 310 as the supply sources is execution of the received print job.

Further, according to the table 42, it can be seen that the operation of the print execution unit 280 corresponding to the second electrical power storage device 320 as the supply source is block of the print job. In other words, it can be seen that the operation of the print execution unit 280 corresponding to the second electrical power storage device 320 as the supply source is prohibition of execution of the received print job.

Hereinafter, an operation of the image forming apparatus 100 of the present embodiment will be described referring to FIGS. 5 and 6.

Figure 5B:
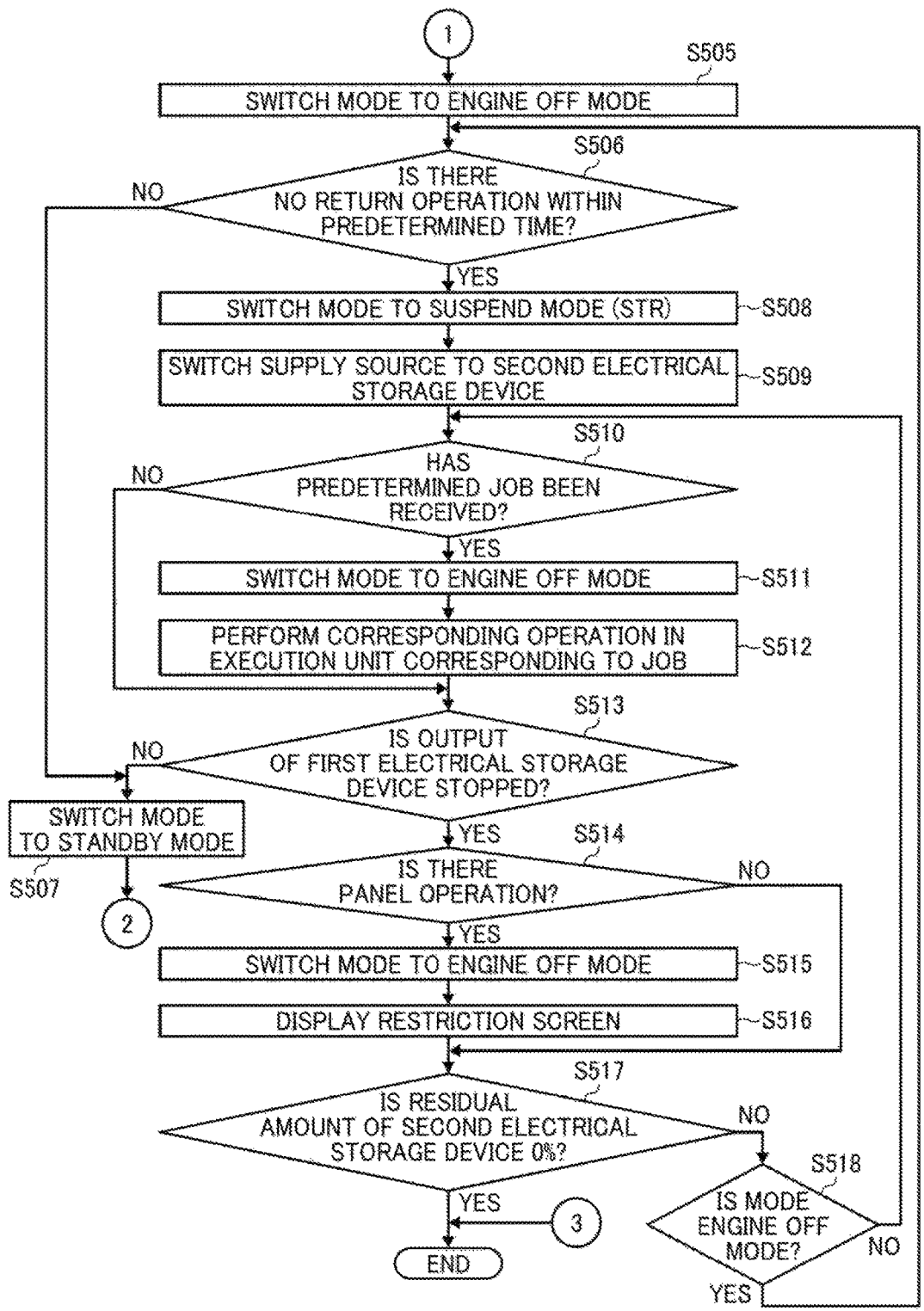
Figure 6:
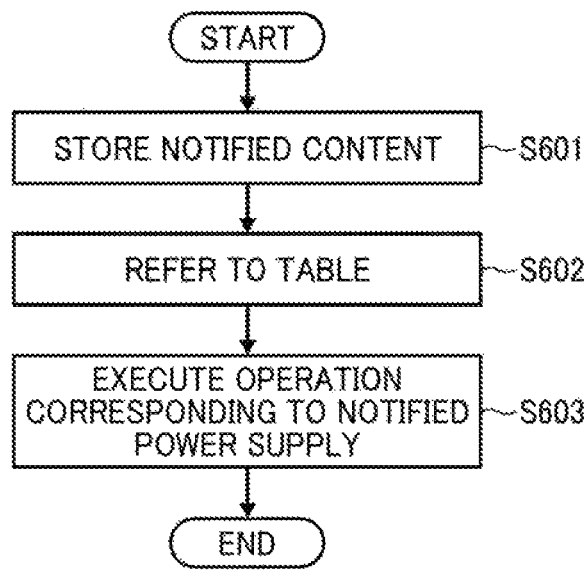
FIG. 6 is a flowchart illustrating an operation of the image forming apparatus of the first embodiment.

FIG. 5 is a flowchart illustrating an operation of the image forming apparatus. The processing illustrated in FIG. 5 is periodically executed by the controller 210.

The image forming apparatus 100 of the present embodiment determines whether the supply source of the power is the commercial power supply 400 by the state monitoring unit 241 of the controller 210 (step S501). In other words, the state monitoring unit 241 determines whether the supply of the power from the commercial power supply 400 is stopped due to power failure or the like.

When the supply source is the commercial power supply 400 in step S501, the controller 210 stands by in the standby mode. Note that, at this time, the state monitoring unit 241 of the controller 210 monitors the states of the supply source of the power and the image forming apparatus 100 by polling or the like. Further, at this time, the state monitoring unit 241 periodically (for example, once every five seconds) inquires of the electrical power storage controller 340 about whether the power is supplied front the commercial power supply 400 to the first electrical power storage device 310.

When the supply source is not the commercial power supply 400 in step S501, the controller 210 switches the supply source of the power to the first electrical power storage device 310 (step S502). To be specific, the controller 210 instructs the electrical power storage controller 340 to switch the supply source of the power to the first electrical power storage device 310, considering that the supply of the power from the commercial power supply 400 is gone, when the supply of the power from the commercial power supply 400 to the first electrical power storage device 310 is stopped.

Hereinafter, switching in step S502 will be described.

The state monitoring unit 241 of the controller 210 notifies the main body state notification unit 242 of detection of stop of the supply of the power from the commercial power supply 400. The main body state notification unit 242 notifies the electrical power storage controller 340 of the stop of the supply of the power from the commercial power supply 400 and an instruction of change of the supply source in response to the notification.

The electrical power storage controller 340 switches the supply source from the commercial power supply 400 to the first electrical power storage device 310 by the supply source switching unit 342 when the notification receiver 341 receives the notification.

Note that the electrical power storage controller 340 of the image forming apparatus 100 may detect stop of the power supply from the commercial power supply 400 to the first electrical power storage device 310, and switch the supply source of the power to the first electrical power storage device 310 to supply the power to the image forming apparatus 100.

Next, the controller 210 determines whether the residual amount of the first electrical power storage device 310 is 10% or more (step S503). To be specific, the controller 210 inquires of the electrical power storage controller 340 about the residual amount of the first electrical power storage device 310, and determines whether the residual amount is 10% or more.

When the residual amount of the first electrical power storage device 310 is not 10% or more, that is, when the residual amount of the first electrical power storage device 310 is less than 10% in step S503, the controller 210 terminates the processing and turns off the power supply of the image forming apparatus 100.

When the residual amount of the first electrical power storage device 310 is 10% or more in step S503, the controller 210 determines whether an operation to the image forming apparatus 100 has been performed within a predetermined time by the state monitoring unit 241 (step S504). When the operation has been performed within the predetermined time in step S304, the controller 210 is returned to step S503.

When the operation has not been performed within the predetermined time in step S504, the controller 210 is transitioned from the standby mode to the engine off mode (step S505).

Next, the controller 210 determines whether an operation to return the mode to the standby mode has been further performed within a predetermined time (step S506). The operation to return the mode to the standby mode is an operation to start the first electrical power storage device 310 to resume an output. When the appropriate operation has been performed in step S506, the controller 210 is transitioned to the standby mode (step S507), and proceeds to step S503.

When the appropriate operation has not been performed in step S506, the controller 210 transfers the image forming apparatus 100 from the engine off mode to the suspend mode (step S508).

Next, the controller 210 changes the supply source from the first electrical power storage device 310 to the second electrical power storage device 320 (step S509). To be specific, the state monitoring unit 241 notifies the main body state notification unit 242 that the image forming apparatus 100 has been transitioned to the suspend mode. The main body state notification unit 242 notifies the electrical power storage controller 340 of the transfer of the image forming apparatus 100 to the suspend mode, and a switching instruction of the supply source, in response to the notification. The electrical power storage controller 340 switches the supply source from the first electrical power storage device 310 to the second electrical power storage device 320 by the supply source switching unit 342 in response to the notification received by the notification receiver 341.

The power is supplied to the image forming apparatus 100 through the second electrical power storage device 320 in the electrical power storage controller 340 when the power is supplied from the first electrical power storage device 310 to the image forming apparatus 100. Therefore, the power is automatically supplied from the second electrical power storage device 320 to the image forming apparatus 100 when the supply of the power from the first electrical power storage device 310 is stopped in the electrical power storage controller 340.

Therefore, in the present embodiment, when the power supply from the first electrical power storage device 310 is stopped by the supply source switching unit 342, the supply of the power from the second electrical power storage device 320 is started.

Note that, in the present embodiment, when the operation to return the mode to the standby mode (an operation to turn ON the first electrical power storage device 310) is performed for the image forming apparatus 100 after the power supply from the first electrical power storage device 310 is stopped, the power supply from the first electrical power storage device 310 is resumed. The first electrical power storage device 310 then supplies the power to the main device 200 while charging the second electrical power storage device 320.

Further, in step S509, the controller 210 notifies, by the power supply state notification unit 243, the fax execution unit 270 and the print execution unit 280 of the fact that the supply source has been switched to the second electrical power storage device 320.

Next, the controller 210 determines whether a predetermined job has been received by the state monitoring unit 241 (step S510). When the predetermined job has not been received in step S510, the controller 210 proceeds to step S512 described below.

When the predetermined job has been received in step S510, the controller 210 is transitioned to the engine off mode (step S511), and causes the corresponding execution unit to execute a corresponding operation (step S512). Details of the processing of step S512 will be described below.

Next, the state monitoring unit 241 of the controller 210 determines whether the output from the first electrical power storage device 310 is stopped (step S513). In other words, the state monitoring unit 241 determines whether the operation to return the mode to the standby mode has been performed.

When the output from the first electrical power storage device 310 has been resumed in step S513, the controller 210 proceeds to step S507.

When the output from the first electrical power storage device 310 is stopped, that is, the mode is still the suspend mode in step S513, the controller 210 determines whether the operation has been performed on an operation panel of the image forming apparatus 100 (step S514). When the operation has not been performed in step S514, the controller 210 proceeds to step S517 described below.

When the operation has not been performed on the operation panel in step S514, the controller 210 is transitioned to the engine off mode (step S515), and causes the operation panel to display a restriction screen (step S516). The restriction screen is a screen on which a message is displayed, the message notifying that use of the functions of the image forming apparatus 100 is restricted. That is, the second electrical power storage device 320 of the present embodiment supplies the power to the controller 210 and the operation panel.

Next, the controller 210 determines whether the residual amount of the second electrical power storage device 320 becomes 0% (step S517). When the residual amount is not 0% in step S517, the controller 210 determines whether the current mode is the engine off mode (step S518).

When the mode is the engine off mode in step S518, the controller 210 is returned to step S506. When the mode is not the engine off mode, that is, the mode is the suspend mode in step S518, the controller 210 is returned to step S510. When the residual amount becomes 0% in step S517, the controller 210 terminates the processing, turns off the image forming apparatus 100, and terminates the processing.

Note that the predetermined times in FIG. 5 may be the same time or may be individually set times.

Next, the processing of step S512 of FIG. 5 will be described. FIG. 6 is a second flowchart illustrating an operation of the image forming apparatus. The processing illustrated in FIG. 6 illustrates details of the processing of step S512 of FIG. 5. In FIG. 6, a case in which the predetermined job is reception of fax data will be described, for example.

The fax execution unit 270 of the controller 210 of the present embodiment receives the notification of the supply source of the power by the notification receiver 271, and holds notified content (step S601). Next, the fax execution unit 270 refers to the table 41 held in the table storing unit 273 by the operation selection unit 272 (step S602), and performs an operation corresponding to the notified supply source (step S603).

Here, the notification receiver 271 receives notification indicating that the supply source of the power is the second electrical power storage device 320. Therefore, the operation selection unit 272 refers to the table 41, and may just perform the operations "reception and storage of the fax data" corresponding to the supply source "second electrical power storage device 320".

At this time, the fax execution unit 270 may start the operation panel, and light a light emitting diode (LED) provided in the operation panel to notify a user of the reception of the fax data.

As described above, according to the present embodiment, the image forming apparatus 100 is operated by the first electrical power storage device 310 and the second electrical power storage device 320 when the supply of the power from the commercial power supply 400 to the image forming apparatus 100 is stopped.

Further, according to the present embodiment, the output from the first electrical power storage device 310 is stopped and the image forming apparatus 100 is operated by the second electrical power storage device 320 when an operation or a job is not received for a predetermined time in a case where the supply source of the power of the image forming apparatus 100 is the first electrical power storage device 310.

Then, in the present embodiment, a predetermined job determined in advance is executed and use of most part of the functions of the image forming apparatus 100 is prohibited when the image forming apparatus 100 is operated by the second electrical power storage device 320.

Therefore, in the present embodiment, the consumption of the stored power of the electrical power storage device can be moderated and the consumption of the power can be suppressed in a case where the supply of the power from the commercial power supply 400 is stopped. Therefore, according to the present embodiment, the function that is of high importance and needs to be operated on a constant basis can be realized over a long period of time.

Note that, in the present embodiment, the supply source of the power has been switched to the first electrical power storage device 310 when the supply of the power from the commercial power supply 400 is stopped. However, an embodiment is not limited to the case. In the present embodiment, the supply source of the power may be switched to the first electrical power storage device 310 by the operation of a user or the like even in a state where the supply of the power from the commercial power supply 400 can be received.

<Second Embodiment>

A second embodiment will be described referring to the drawings. The present embodiment is different from the first embodiment in receiving a specific operation, of operations to an image forming apparatus, when a supply source of power to a main device is a second electrical power storage device. Therefore, in the second embodiment below, the different point from the first embodiment will be described. An element having a similar functional configuration to the first embodiment is denoted with a sign similar to the sign used in the description of the first embodiment, and description of the element is not repeated.

Figure 7:
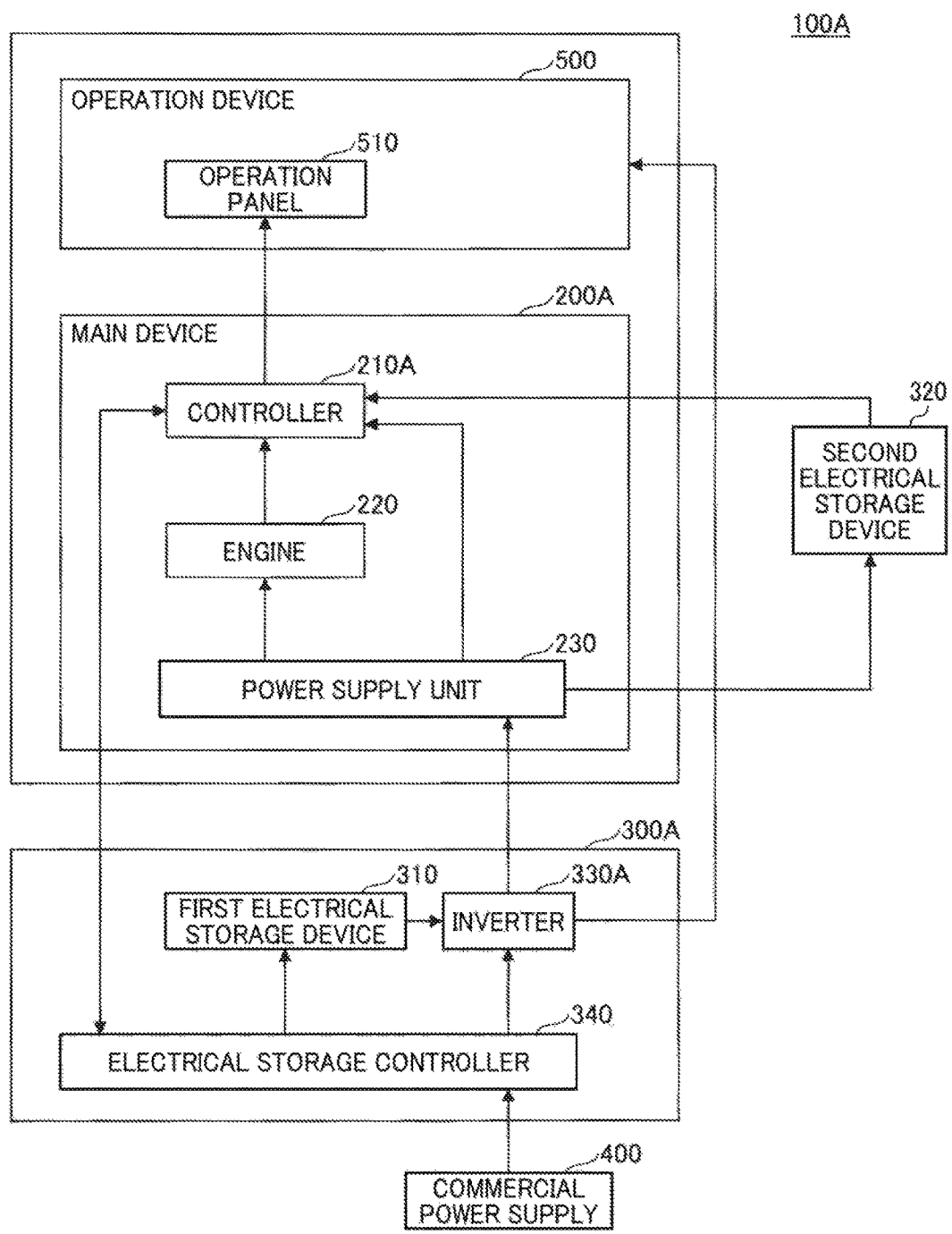
FIG. 7 is a diagram illustrating an outline of a configuration of an image forming apparatus of a second embodiment.

An embodiment will be described below referring to the drawings. FIG. 7 is a diagram illustrating an outline of a configuration of an image forming apparatus of the second embodiment.

An image forming apparatus 100A of the present embodiment includes a main device 200A, an electrical power storage device 300A, and an operation device 500. In other words, the image forming apparatus 100A of the present embodiment is an image forming system including the main device 200A, the operation device 500, and the electrical power storage device 300A. The main device 200A and the operation device 500 are supplied power through the electrical power storage device 300A.

A main device 200A of the present embodiment includes a controller 210A, the engine 220, and the power supply unit 230, and executes various jobs such as a job according to an operation received by an operation device 500 and a job input from an outside. The various jobs are print of print data transmitted to an image forming apparatus 100A, scan or copy of a document, transmission or reception of a facsimile (fax), and the like.

The controller 210A of the present embodiment is a controller including an arithmetic processing unit and a memory. The controller 210A controls, when receiving a job by an operation by the operation device 500 or by an input from an outside, the engine 220 to realize various functions of the image forming apparatus 100A. Further, the controller 210A notifies an electrical power storage device 300 of a state of the image forming apparatus 100A, and causes the main device 200A and the operation device 500 to perform operations corresponding to a supply source of the power (power source).

The electrical power storage device 300A includes the first electrical power storage device 310, the second electrical power storage device 320, an inverter 330A, and the electrical power storage controller 340.

The inverter 330A generates a voltage to be supplied to the controller 210A and a voltage to be supplied to the engine 220, from the power supplied from the power source, and provides the voltages to the main device 200A. Further, the inverter 330A generates a voltage to be supplied to the operation device 500 from the power supplied from the power source, and provides the voltage to the operation device 500.

The operation device 500 of the present embodiment includes an operation panel 510 that receives an operation, and communicates with the main device 200A. That is, the operation device 500 of the present embodiment is a display operation device including the operation panel 510 that functions as an operation unit. Note that receiving an operation is a concept including reception of information (including a signal indicating a coordinate value on a screen or the like) input according to an operation of a user.

A home screen including icons corresponding to various functions realized by the image forming apparatus 100A are displayed on the operation panel 510. When an icon is selected on the home screen, the operation device 500 notifies the main device 200A of the function corresponding to the selected icon. The main device 200A realizes the appropriate function in response to the notification. In other words, the main device 200A realizes the function corresponding to the icon selected through the operation panel 510.

Further, the operation device 500 of the present embodiment displays, on the operation panel 510, an operation restriction screen that prohibits reception of an operation to the image forming apparatus 100A, when the operation device 500 receives an operation on the operation panel 510 when the supply source of the power (power source) is the second electrical power storage device 320. In this way, in the present embodiment, use of the functions of the image forming apparatus 100A is restricted. Details of the home screen and the operation restriction screen will be described below.

An operation of the image forming apparatus 100A of the present embodiment overlaps with a part of the operation described using FIG. 2 in the first embodiment. Therefore, here, an overlapping portion is omitted, and an operation of the operation device 500 will be described referring to FIG. 2.

In a state 1 (standby mode), the controller 210A and the engine 220 of the main device 200A and the operation device 500 have been started in the image forming apparatus 100A. In other words, in the state 1, the power of the commercial power supply 400 is supplied to the controller 210, the engine 220, and the operation device 500.

In a state 2 (engine off mode), the controller 210A of the main device 200A and the operation device 500 have been started and the engine 220 is stopped in the image forming apparatus 100A. In other words, in the state 2, the power of the commercial power supply 400 is supplied to the controller 210A and the operation device 500 but the power is not supplied to the engine 220.

In a state 3 (standby mode), the controller 210A and the engine 220 of the main device 200A and the operation panel 5 to have been started in the image forming apparatus 100A. In other words, in the state 3, the power of the first electrical power storage device 310 is supplied to the controller 210A, the engine 220, and the operation panel 510.

In a state 4 (engine off mode), the controller 210A and the operation panel 510 have been started and an operation of the engine 220 is stripped in the main device 200 of the image forming apparatus 100A. In other words, in the state 4, the power of the first electrical power storage device 310 is supplied to the controller 210A and the operation panel 510 but the power is not supplied to the engine 220. Further, in the state 4, the second electrical power storage device 320 is not allowed to output the power (output OFF).

In a state 5 (suspend mode engine off mode), the controller 210A has been started and operations of the engine 220 and the operation panel 510 are stopped in the main device 200A of the image forming apparatus 100A. In other words, in the state 5, the power of the second electrical power storage device 320 is supplied to the controller 210A but the power is not supplied to the engine 220 and the operation panel 510. Further, in the state 5, when the mode is switched to the suspend mode of the state 5, the image forming apparatus 100A restricts use of the functions other than reception of a predetermined job.

Further, when the image forming apparatus 100A receives a predetermined job in the suspend mode of the state 5, the image forming apparatus 100A is transitioned to the engine off mode while maintaining the second electrical power storage device 320 as the supply source of the power and performs processing according to the job. At this time, the image forming apparatus 100A starts the operation panel 510 while maintaining the second electrical power storage device 320 as the supply source, and lights a light emitting diode (LED) included in the operation panel 510 to notify the user that the predetermined job is executed.

Further, the image forming apparatus 100A causes the operation panel 510 to display the operation restriction screen while maintaining the second electrical power storage device 320 as the supply source of the power when the image forming apparatus 100A receives an operation on the operation panel 510 in the suspend mode of the state 5.

Hereinafter, an operation of the image forming apparatus 100A of a case in which an operation restriction screen is displayed in the operation device 500 of the present embodiment will be described referring to FIG. 8. FIG. 8 is a sequence diagram illustrating an operation of the image forming apparatus of when the operation restriction screen is displayed.

The main device 200A of the image forming apparatus 100A of the present embodiment inquires of the electrical power storage device 300A about the supply source of the power (step S801), and determines whether the supply source is the commercial power supply 400 (step S802).

When the supply source is not the commercial power supply 400, the main device 200A changes the supply source of the power of the electrical power storage device 300A to the first electrical power storage device 310 (step S803).

The main device 200A transfers the state of the imaging apparatus 100A from the standby mode to the engine off mode when an operation has not been performed for a predetermined time after the supply source is changed to the first electrical power storage device 310 (step S804). Further, the main device 200A notifies the electrical power storage device 300A that the mode has been transitioned from the standby mode to the engine off mode (step S805).

Next, the main device 200A transfers the state of the image forming apparatus 100A from the engine off mode to the suspend mode when an operation has not been performed for a predetermined time after the mode is transitioned to the engine off mode (step S806). Then, the main device 200A changes the supply source of the power of the electrical power storage device 300A to the second electrical power storage device 320 (step S807).

Further, the main device 200A notifies the operation device 500 that the mode has been changed from the engine off mode to the suspend mode (step S808).

When an operation on the operation panel 510 is performed in the suspend mode (step S809), the operation device 500 notifies the main device 200A of reception of the operation (step S810).

The main device 200A transfers the mode from the suspend mode to the engine off mode while maintaining the second electrical power storage device 320 as the supply source in response to the notification (step S811). The main device 200A then notifies the operation device 500 of the transfer to the engine off mode (step S812).

The operation device 500 causes the operation panel 510 to display the operation restriction screen in response to the notification (step S813).

In the present embodiment, the operation restriction screen is displayed as described above. Therefore, use of the functions of the image forming apparatus 100A in a case where the supply source of the power is the second electrical power storage device 320 can be easily restricted.

Here, screens displayed on the operation panel 510 of the present embodiment will be described referring to FIGS. 9A and 9B.

Figure 9B:
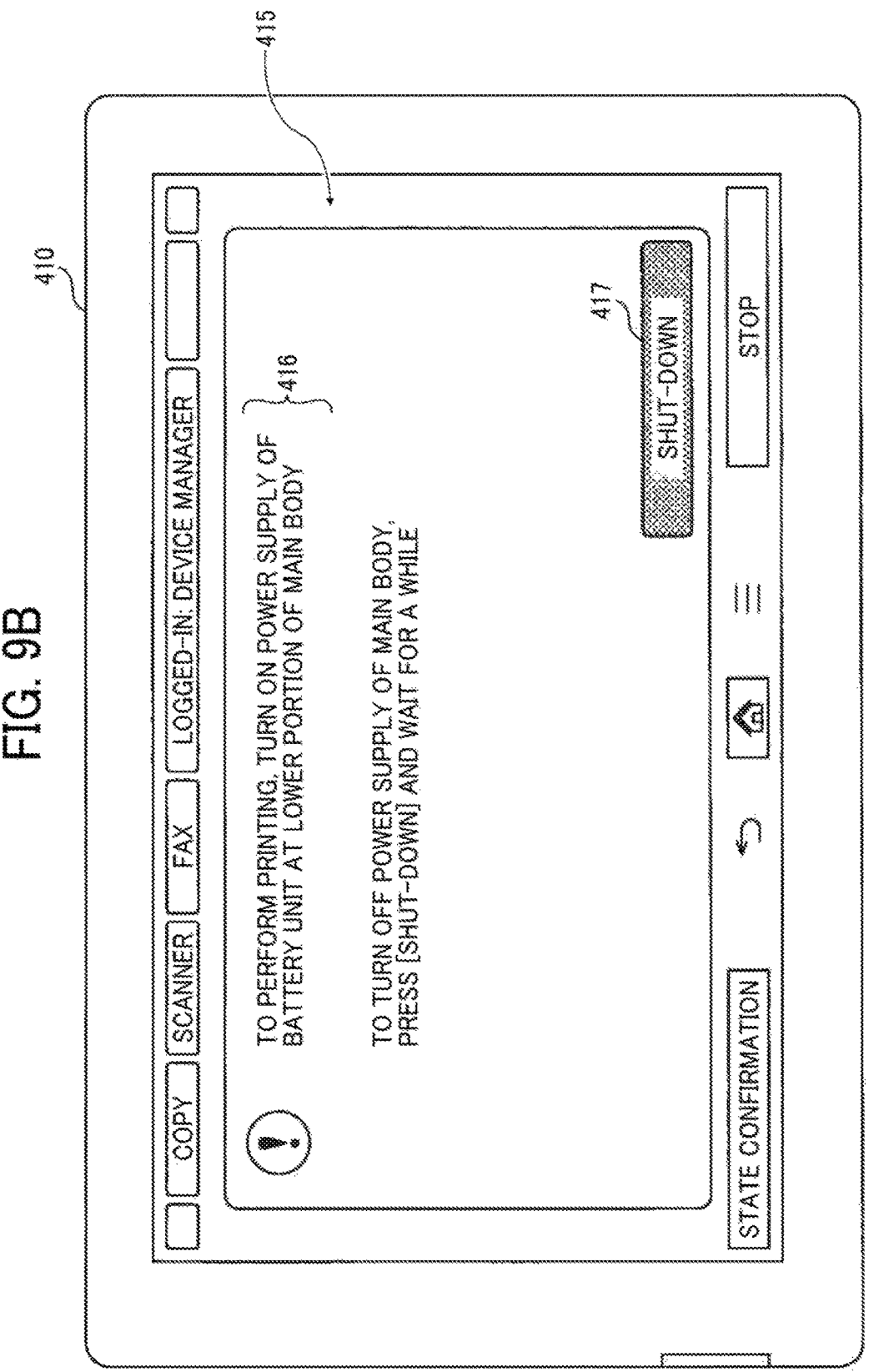

FIGS. 9A and 9B are views illustrating examples of screens displayed on the operation panel. FIG. 9A illustrates an example of the home screen and FIG. 9B illustrates an example of the operation restriction screen.

On a home screen 411 illustrated in FIG. 9A, icons 412, 413, and 414 corresponding to the functions realized in the image forming apparatus 100A are displayed. The icon 412 corresponds to a copy function, the icon 413 corresponds to a scan function, and an icon 414 corresponds to a fax function. When the image forming apparatus 100A receives an operation to select the icon 412, for example, the main device 200A executes processing for realizing the copy function corresponding to the icon 112.

An operation restriction screen 415 illustrated in FIG. 9B is displayed to cover the home screen 411. The operation restriction screen 415 displays a message 416 prompting the user to switch the supply source to the first electrical power storage device 310 when the user uses a restricted function.

Further, the operation restriction screen 415 displays a button 417 for turning off the power supply of the image forming apparatus 100A. An operation of the button 417 is allowed on the operation restriction screen 415. When the button 417 is operated, the supply of the power from the second electrical power storage device 320 is stopped and the image forming apparatus 100A is shut down.

As described above, in the present embodiment, the operation restriction screen that prohibits reception of an operation is superimposed and displayed on the home screen on the operation panel 510. Therefore, the operation to the image forming apparatus 100A is restricted. In the present embodiment, restriction of the operation to the operation panel 510 restricts the functions available in the image forming apparatus 100A.

Therefore, according to the present embodiment, use of the functions of the image forming apparatus 100A can be easily restricted without revising applications corresponding to the functions and a general-purpose operating system (OS).

Figure 10:
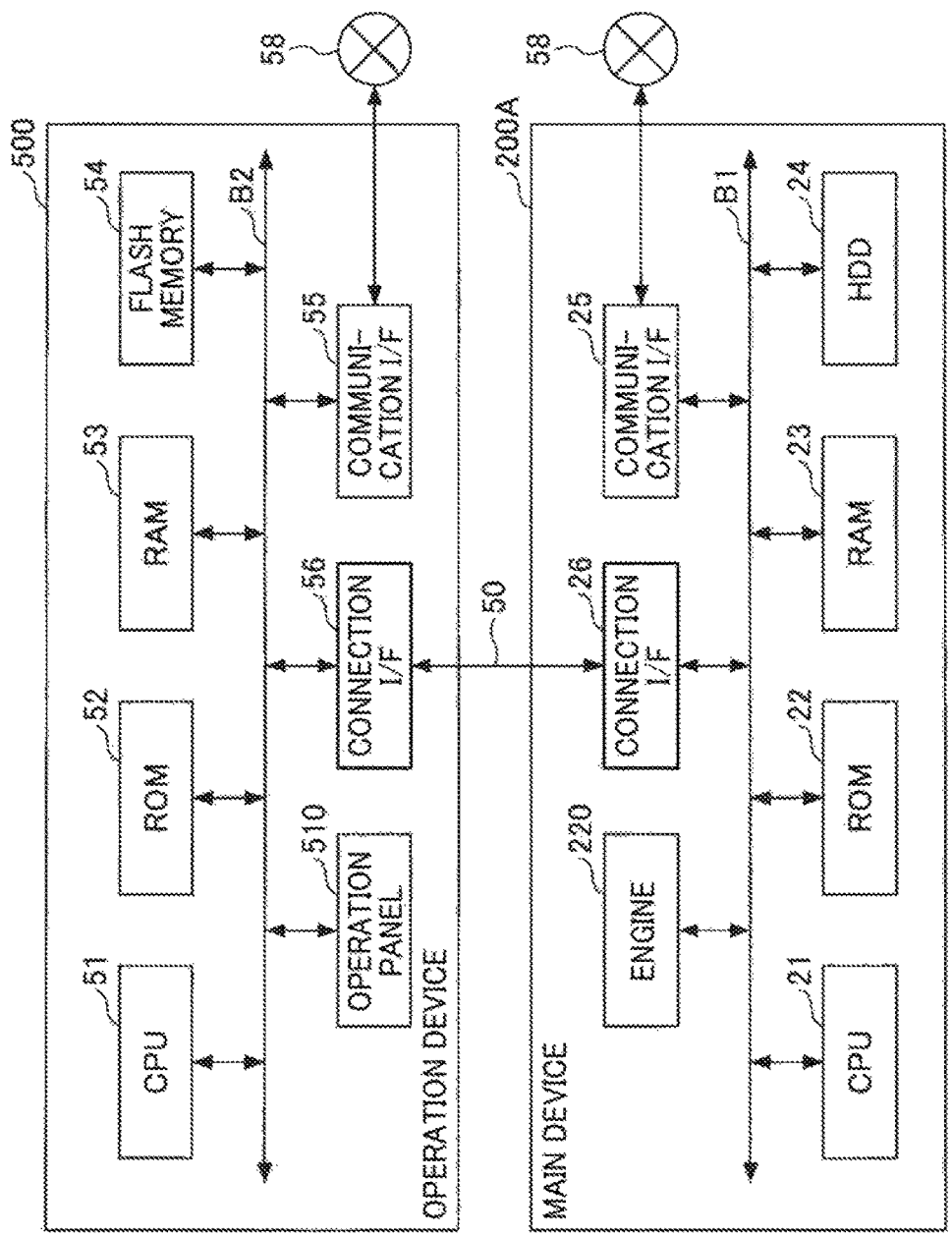
FIG. 10 is a diagram illustrating a hardware configuration of the image forming apparatus of the second embodiment.

Hereinafter, the image forming apparatus 100A of the present embodiment will be further described. FIG. 10 is a diagram illustrating a hardware configuration of the image forming apparatus. Note that FIG. 10 illustrates hardware configurations of the main device 200A and the operation device 500.

The main device 200A and the operation device 500 are communicatively connected with each other through a special communication path 50. As the communication path 50, a universal serial bus (USB)-standardized communication path can be used. However, an arbitrary wired or wireless standard communication path may be used.

Note that the main device 200A can perform an operation according to an operation received in the operation device 500. Further, the main device 200A can communicate with an external device such as a client personal computer (PC), and can also perform an operation according to an instruction received from the external device.

First, a hardware configuration of the main device 200A will be described. As illustrated in FIG. 10, the main device 200A includes a central processing unit (CPU) 21, a read only memory (ROM) 22, a random access memory (RAM) 23, a hard disk drive (HDD) 24, a communication interface (I/F) 25, a connection I/F 26, and the engine 220. These elements are connected with one another through a system bus B1.

In the present embodiment, the CPU 21, the ROM 22, and the RAM 23 may be included in the controller 210A, for example.

The CPU 21 generally controls the operation of the main device 200A. The CPU 21 executes a program stored in the ROM 22 or the HDD 24, using the RAM 23 as a work area, to control the operation of the entire main device 200A to realize the various functions such as the copy function, the scan function, the fax function, and the print function.

The communication I/F 25 is an interface for being connected with a network 58. The connection I/F 26 is an interface for communicating with the operation device 500 through the communication path 50.

The engine 220 is hardware that performs general-purpose information processing and processing other than communication to realize the copy function, the scan function, the fax function, and the print function. For example, the main device 200A includes a scan (image reader) that scans and reads an image on a document, a plotter (image forming unit) that performs print on a sheet material such as a paper, and a fax unit that performs fax communication. Further, the main device 200A can also include specific options such as a finisher that sorts a printed sheet material and an automatic document feeder (ADF) that automatically feeds the document.

Next, a hardware configuration of the operation device 500 will be described. As illustrated in FIG. 10, the operation device 500 includes a CPU 51, a ROM 52, a RAM 53, a flash memory 54, a communication I/F 55, a connection I/F 56, and the operation panel 510. These elements are connected with one another through a system bus B2.

The CPU 51 generally controls the operation of the operation device 500. The CPU 51 executes a program stored in the ROM 52 or the flash memory 54, using the RAM 53 as a work area, to control the operation of the entire, operation device 500 to realize various functions such as display of information (an image) according to an input received from the user.

The communication I/F 55 is an interface for being connected with the network 58. The connection I/F 56 is an interface for communicating with the main device 200A through the communication path 50.

The operation panel 510 is one of display operation devices that receive various inputs according to operations of the user, and display various types of information (for example, information according to a received operation, information indicating an operation status of the image forming apparatus 100A, information indicating a set state, and the like). In this example, the operation panel 510 is configured from, but not limited to, a liquid crystal display (LCD) having a touch panel function. For example, the operation panel 510 may be configured from an organic electroluminescence (EL) display having a touch panel function. Further, an operation unit such as a hardware key or a display unit such as a lamp can be provided in addition to or in place of the above configuration.

Figure 11:
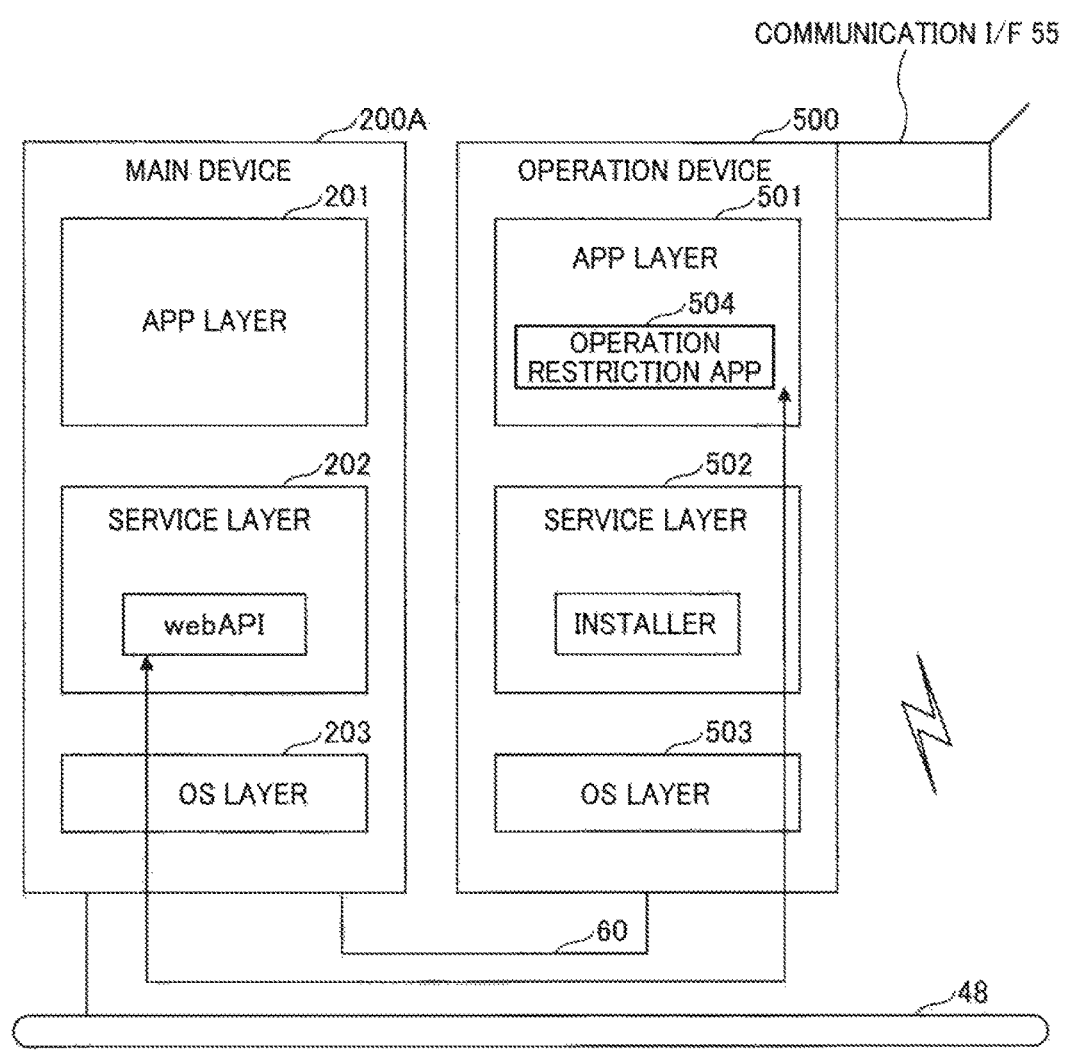
FIG. 11 is a schematic diagram illustrating an example of a software configuration of the image forming apparatus of the second embodiment.

Next, a software configuration of the image forming apparatus 100A will be described. FIG. 11 is a schematic diagram illustrating an example of a software configuration of the image forming apparatus. FIG. 11 illustrates an example of software configurations of the main device 200A and the operation device 500.

As illustrated in FIG. 11, the main device 200A includes an app layer 201, a service layer 202, and an operating system (OS) layer 203. Entity of the app layer 201, the service layer 202, and the OS layer 203 is various types of software stored in the ROM 22 or the HDD 24. The CPU 21 executes the software to realize various functions.

The software of the app layer 201 is application software (may be simply referred to as "app" in the description below) for operating hardware resources to provide a pre-determine function. Examples of the app include a copy app for providing the copy function, a scan app for providing the scan function, a fax app for providing the fax function, and a print app for providing the print function.

The software of the service layer 202 is software lying between the app layer 201 and the OS layer 203, and providing an interface for using hardware resources included in the main device 200A to the app. To be specific, the service layer 202 is software for providing functions to receive operation requests to the hardware resources and to mediate the operation requests. As the operation request received by the service layer 202, a request of readout with the scan and print with the plotter can be considered.

Note that the interface function by the service layer 202 is provided to the app layer 201 of the main device 200A and also to an app layer 501 of the operation device 500. That is, the app layer 501 (app) of the operation device 500 can also realize a function using the hardware resources (for example, the engine 220) of the main device 200A through the interface function of the service layer 202. For example, the interface function of the service layer 202 is provided with a web application programming interface (API). The operation device 500 and the main device 200A can perform communication using the communication path 50 as a network.

The software of the OS layer 203 is basic software (operating system) tor providing a basic function to control the hardware included in the main device 200A. The software of the service layer 202 converts use requests of the hardware resources from various apps into commands interpretable by the OS layer 203 and passes the commands to the OS layer 203. Then, when the command is executed by the software of the OS layer 203, the hardware resources perform an operation according to the request of the app.

Similarly, the operation device 500 includes the app layer 501, a service layer 502, and an OS layer 503. As for a hierarchical structure, the app layer 501, the service layer 502, and the OS layer 503 included in the operation device 500 are similar to the app layer 501, the service layer 502, and the OS layer 503 of the main device 200A side. However, functions provided by an app of the app layer 501, and types of operation requests receivable by the service layer 502 are different from the functions or types of the main device 200A side. In the present embodiment, software of the service layer 502 includes an installer and the like.

The app of the app layer 501 may be software for operating hardware resources included in the operation device 500 to provide predetermined functions. However, the app is software for providing the functions of a user interface (UI) for mainly performing operations and displays regarding the functions included in the main device 200A (the copy function, the scan function, the fax function, and the print function).

Note that, in the present embodiment, the software of the OS layer 203 of the main device 200A side and the software of the OS layer 503 of the operation device 500 side are different from each other in order to maintain independency of the functions. That is, the main device 200A and the operation device 500 are independently operated of each other in separate operating systems. For example, NetBSD (registered trademark) can be used as the software of the OS layer 203 of the main device 200A side, and Android (registered trademark) can be used as the software of the OS layer 503 of the operation device 500 side. Further, the app layer 501 of the operation device 500 includes an operation restriction application 504 for displaying an operation restriction screen on the operation panel 510.

As described above, in the image forming apparatus 100A of the present embodiment, the main device 200A and the operation device 500 are operated in separate operating systems. Therefore, the communication between the main device 200A and the operation device 500 is performed as communication between different devices, rather than inter-process communication in a common device. An operation (command communication) to transmit information (instruction content from the user) received by the operation device 500 to the main device 200A, and an operation to notify the operation device 500 of an event by the main device 200A correspond to the communication between different devices. Here, when the operation device 500 performs the command communication for the main device 200A, the functions of the main device 200A can be used.

Further, examples of the event notified from the main device 200A to the operation device 500 include an execution status of an operation in the main device 200A, and content set by the main device 200A side.

Further, in the present embodiment, the power supply to the operation device 500 is performed by the main device 200A through the communication path 50. Therefore, power supply control of the operation device 500 can be separately (independently) performed from power supply control of the main device 200A.

Figure 12:
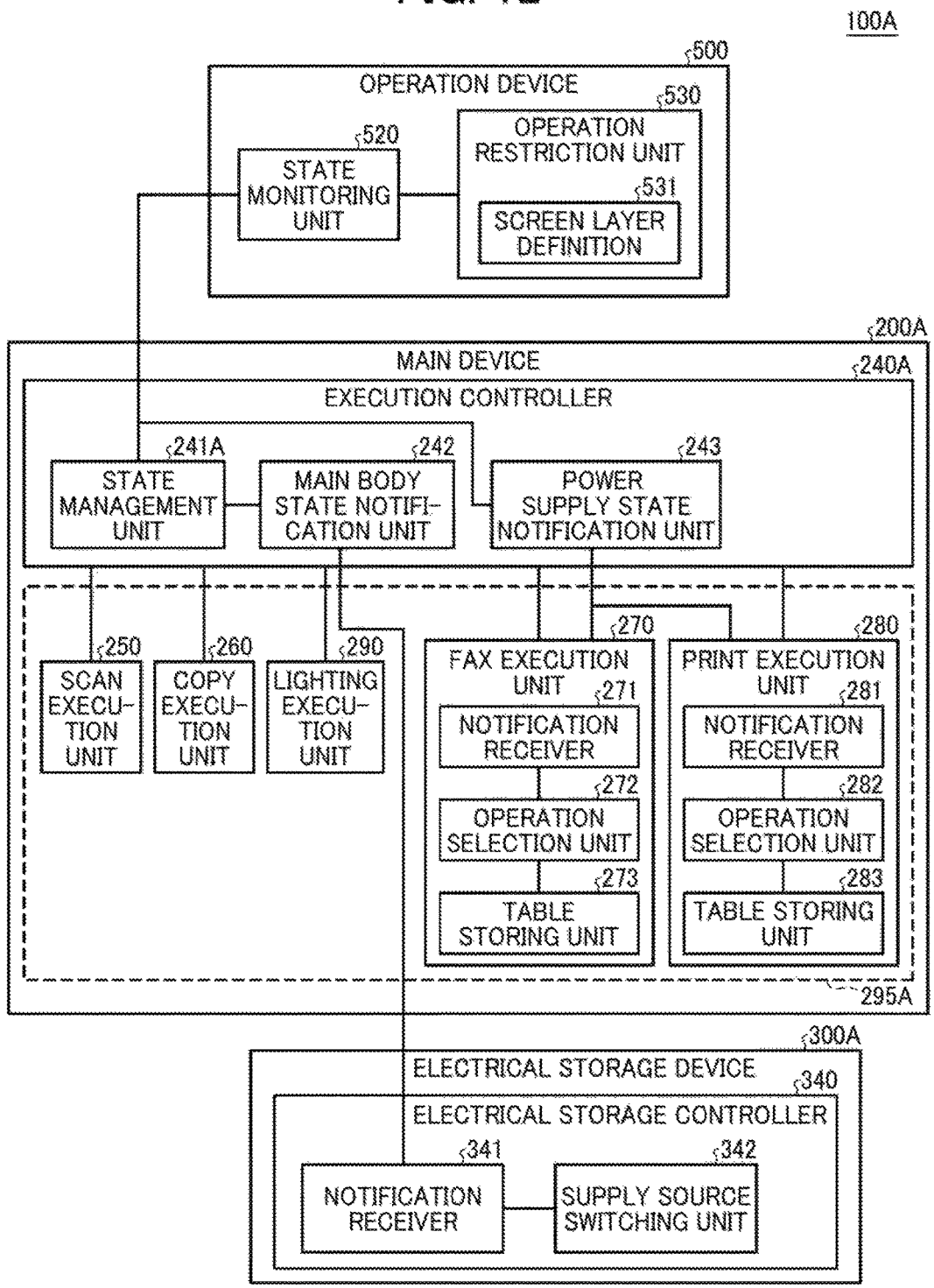
FIG. 12 is s diagram illustrating functions of the devices included in the image forming apparatus of the second embodiment.

Next, functions of the devices included in the image forming apparatus 100A of the present embodiment will be described referring to FIG. 12. FIG. 12 is a diagram illustrating functions of the devices included in the image forming apparatus.

First, functions of the main device 200A of the present embodiment will be described. The main device 200A realizes functions of units below when the CPU 21 reads and executes a program stored in the ROM 22 or the RAM 23 in the controller 210A.

The main device 200A of the present embodiment includes an execution controller 240A, the scan execution unit 250, the copy execution unit 260, the fax execution unit 270, the print execution unit 280, and a lighting execution unit 290. The scan execution unit 250, the copy execution unit 260, the fax execution unit 270, the print execution unit 2S0, and the lighting execution unit 290 of the present embodiment form an image processing device 295A.

The execution controller 240A controls execution of the job received by the controller 210A. Further, the execution controller 240A operates the image forming apparatus 100A in the mode according to the state of the image forming apparatus 100A. Further, the execution controller 240A of the present embodiment causes the fax execution unit 270, the print execution unit 280, and the lighting execution unit 290 to execute processing according to the supply source of the power of the image forming apparatus 100A.

The execution controller 240A of the present embodiment includes a state management unit 241A, the main body state notification unit 242, and the power supply state notification unit 243. The state management unit 241A notifies the operation device 500 of notification of change of the state of the image forming apparatus 100A or the like. The state of the image forming apparatus 100A includes the supply source of the power and the modes of the operation.

The scan execution unit 250, the copy execution unit 260, the fax execution unit 270, the print execution unit 280, and the lighting execution unit 290 of the present embodiment respectively correspond to the functions of the image forming apparatus 100A and realize the corresponding functions. Note that the execution units illustrated in FIG. 12 are examples, and the functions of the image forming apparatus 100A are not limited to the examples. The image forming apparatus 100A may have a function other than the functions realized by the execution units illustrated in FIG. 12 or may have a part of the functions realized by the execution units illustrated in FIG. 12.

The scan execution unit 250 corresponds to a scan app and the copy execution unit 260 corresponds to a copy app. The fax execution unit 270 corresponds to a fax app and the print execution unit 280 corresponds to a print app.

The lighting execution unit 290 corresponds to a lighting app, and lights the LED provided in the operation panel 510 according to the job executed by the execution controller 240A.

The scan execution unit 250, the copy execution unit 260, and the lighting execution unit 290 of the present embodiment perform similar operations even in a case where the supply source of the power is the commercial power supply 400 or the first electrical power storage device 310. Further, the lighting execution unit 290 lights the LED in a predetermined pattern according to a type of the job even in a case where the supply source is the second electrical power storage device 320.

Therefore, the state management unit 241A of the present embodiment may notify the scan execution unit 250, the copy execution unit 260, and the lighting execution unit 290 of the supply source of the power.

Next, functions of the operation device 500 will be described. The operation device 500 of the present embodiment includes a state monitoring unit 520 and an operation restriction unit 530.

When the state monitoring unit 520 of the present embodiment receives notification of change of the state of the image forming apparatus 100A from the state management unit 241A of the main device 200A, the state monitoring unit 520 notifies the UIs corresponding to the execution units included in the main device 200A of the notification. The state monitoring unit 520 of the present embodiment is software included in the service layer 502 of the operation device 500.

Note that the state monitoring unit 520 of the present embodiment may periodically inquire of the main device 200A about the state of the image forming apparatus 100A.

The operation restriction unit 530 of the present embodiment displays the operation restriction screen on the operation panel 510. The operation restriction unit 530 of the present embodiment displays the operation restriction screen when receiving an operation on the operation panel 510 after the supply source of the power becoming the second electrical power storage device 320 is notified by the state monitoring unit 520.

The operation restriction unit 530 of the present embodiment is software included in the app layer 501 of the operation device 500. To be specific, the operation restriction unit 530 is an operation restriction application 504 operated on the OS of the operation device 500. In other words, the operation restriction unit 530 is realized when the CPU 51 reads and executes the operation restriction application 504.

The operation restriction application 504 of the present embodiment forms the operation restriction screen that is a highest-order layer in a screen layer definition described below when receiving notification indicating that the supply source of the power becomes the second electrical power storage device 320 by the suite monitoring unit 520.

In the description below, the notification indicating that the supply source of the power becomes the second electrical power storage device 320 is called notification to enable the operation restriction application 504. In other words, the enabling notification is a formation instruction of an image of the operation restriction screen from the state monitoring unit 520 to the operation restriction unit 530. The operation restriction application 504 is enabled by the enabling notification.

Enabling the operation restriction application 504 refers to the state of the operation device 500 being set to a state in which the light of the operation panel 510 is turned off and the interior of the operation panel 510 is started, an image of the message screen (operation restriction screen) to be displayed on the higher-order layer of the home screen 411 is formed, and the processing stands by.

That is, the state in which the operation restriction application 504 is enabled is a state in which the power to keep the interior started is supplied to the operation panel 510, and the operation restriction screen is made displayable when an operation is received. Therefore, the operation restriction screen is not displayed on the operation panel 510 in the state where the operation restriction application 504 is enabled.

Further, the operation restriction application 504 of the present embodiment is not displayed on the operation panel 510 as an icon, and is executed when enabled.

Further, the operation restriction unit 530 of the present embodiment includes a screen layer definition 531 that defines priority of the screen, and the operation restriction screen is displayed on the operation panel 510 according to the screen layer definition.

Figure 13:
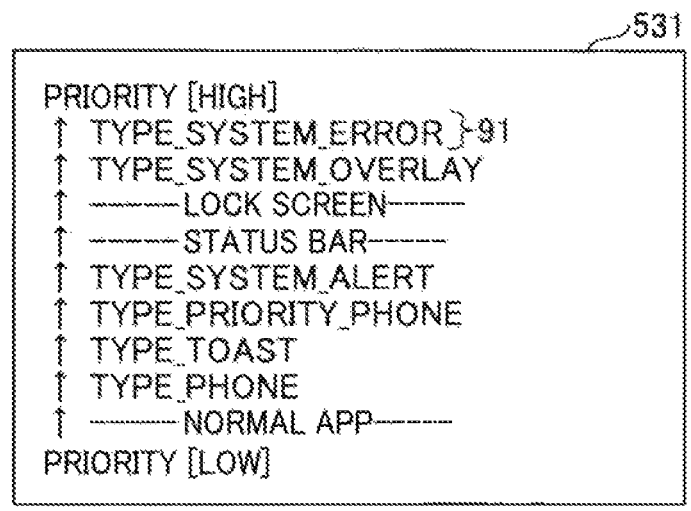
FIG. 13 is a view illustrating a screen layer definition of the second embodiment.

Hereinafter, the screen layer definition held by the operation restriction unit 530 of the present embodiment will be described referring to FIG. 13. FIG. 13 is a diagram illustrating the screen layer definition.

In the present embodiment, the priority of the screen to be displayed on the operation panel 510 is described in the screen layer definition 531.

Description 91 in the screen layer definition 531 defines that the priority of the screen that is displayed when the supply of the power from the commercial power supply 400 is stopped and the supply source becomes the second electrical power storage device 320 is the highest.

Therefore, the operation restriction unit 530 of the present embodiment displays the operation restriction screen to cover the entire operation panel 510 on the highest-order layer of the layers (hierarchy) of the screen, in the state where the supply source of the power is the second electrical power storage device 320.

Figure 15:
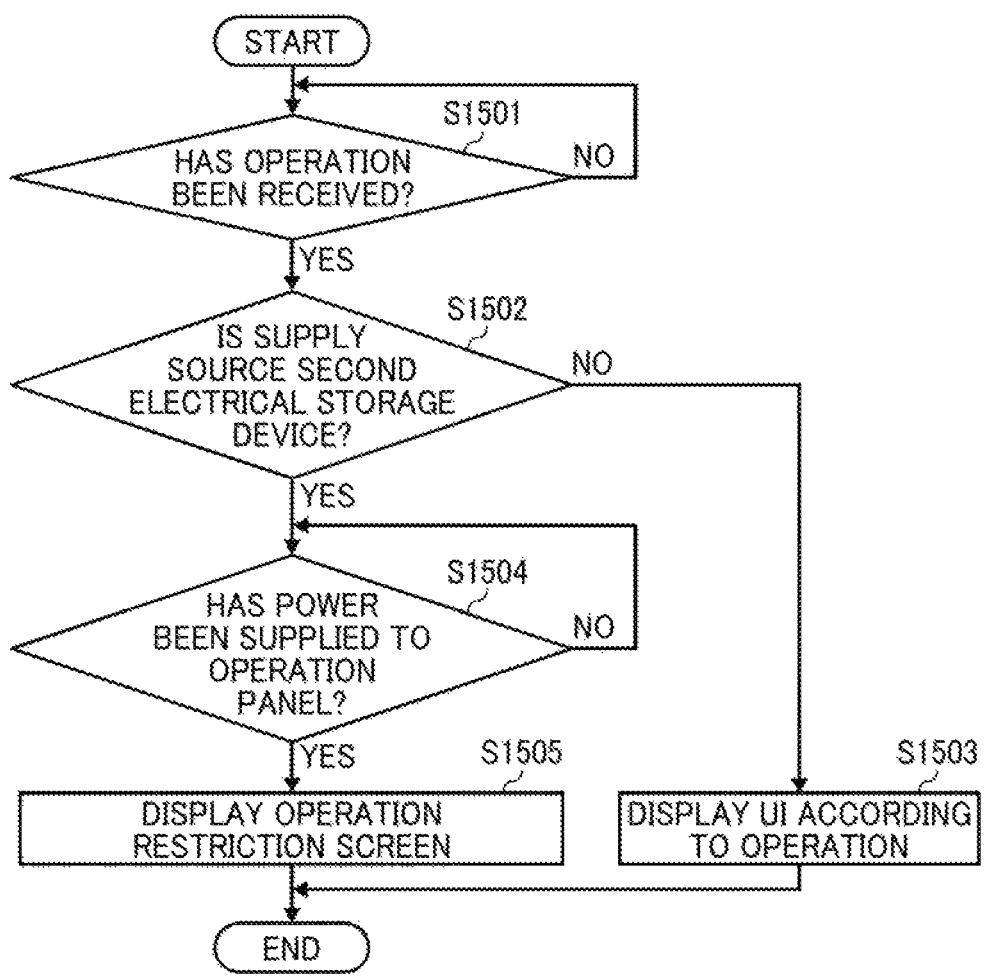
FIG. 15 is a flowchart illustrating an operation of the image forming apparatus of the second embodiment.

Next, an operation of the image forming apparatus 100A of the present embodiment will be described referring to FIGS. 14 and 15.

FIG. 14 is a flowchart illustrating an operation of the image forming apparatus of the second embodiment. FIG. 14 illustrates an operation of the main device 200A of the image forming apparatus 100A of the present embodiment. The processing illustrated in FIG. 14 is periodically executed by the controller 210A.

The image forming apparatus 100A of the present embodiment determines whether the supply source of the power is the commercial power supply 400 by the state management unit 241A of the controller 210A (step S1401). In other words, the state management unit 241A determines whether the supply of the power from the commercial power supply 400 is stopped due to power failure or the like.

When the supply source is the commercial power supply 400 in step S1401, the controller 210A stands by in the standby mode. Note that, at this time, the state management unit 241A of the controller 210A monitors the states of the supply source of the power and the image forming apparatus 100A by polling or the like.

When the supply source is not the commercial power supply 400 in step S1401, the controller 210A switches the supply source of the power to the first electrical power storage device 310 (step S1402).

To be specific, the state management unit 241A notifies the main body state notification unit 242 of detection of cutoff of the supply of the power from the commercial power supply 400. The main body state notification unit 242 notifies the electrical power storage controller 340 of the stop of the supply of the power from the commercial power supply 400 and an instruction of change of the supply source in response to the notification.

The electrical power storage controller 340 switches the supply source from the commercial power supply 400 to the first electrical power storage device 310 by the supply source switching unit 342 when the notification receiver 341 receives the notification.

Next, the state management unit 241A notifies the state monitoring unit 520 of the operation device 500 of the change of the supply source to the first electrical power storage device 310 (step S1403), and proceeds to step S1404.

The processing from step S1404 to step S1410 is similar to the processing front step S503 to step S509 of FIG. 5, and thus description is omitted.

Following step S1410, the controller 210A notifies the state monitoring unit 520 of the operation device 500, of the change of the supply source to the second electrical power storage device 320, the state management unit 241A (step S1411).

Next, the state management unit 241A activates the operation restriction application (step S1412).

Next, the controller 210A determines whether a predetermined job has been received by the state management unit 241A (step S1413). When the predetermined job has not been received in step S1413, the controller 210A proceeds to step S1416 described below.

When the predetermined job has been received in step S1413, the controller 210A is transitioned to the engine off mode while maintaining the second electrical power storage device 320 as the supply source of the power, and starts the supply of the power to the operation panel 510 (step S1414). Next, the controller 210A causes a corresponding execution unit to execute a corresponding operation (step S1415).

Next, the state management unit 241A of the controller 210A determines whether an output from the first electrical power storage device 310 is stopped (step S1416). In other words, the state management unit 241A determines whether the operation to return the mode to the standby mode has been performed.

When the output from the first electrical power storage device 310 has been resumed in step S1416, the controller 210A is returned to step S1408.

When the output from the first electrical power storage device 310 is stopped, that is, the mode is still the suspend mode in step S1416, the controller 210A determines whether the operation has been performed on the operation panel 510 (step S1417). When the operation has not been performed in step S1417, the controller 210A proceeds to step S1419 described below.

When the operation has been performed on the operation panel 510 in step S1417, the controller 210A is transitioned to the engine off mode, and starts the supply of the power to the operation panel 510 (step S1418). Here, the operation performed on the operation panel is an operation to instruct start of the operation of the operation panel 510.

Next, the controller 210A determines whether a residual amount of the second electrical power storage device 320 becomes 0% (step S1410). When the residual amount is not 0% in step S1419, the controller 210A determines whether the current mode is the engine off mode (step S1420).

When the mode is the engine off mode in step S1420, the controller 210A is returned to step S1407. When the mode is not the engine off mode, that is, the mode is the suspend mode in step S1420, the controller 210A is returned to step S1413.

When the residual amount becomes 0% in step S1419, the controller 210A terminates the processing, turns off the image forming apparatus 100A, and terminates the processing.

Note that the predetermined times in FIG. 14 may be the same time or may be individually set times.

Further, in the example of FIG. 14, the mode is transitioned to the engine off mode when there is no return event within a predetermined time when the residual amount of the first electrical power storage device 310 is less than 10%. However, an embodiment is not limited to the example. In the present embodiment, the residual amount of the first electrical power storage device 310 that serves as a threshold when the mode is transitioned to the engine off mode when there is no return event within a predetermined time may not be 10%, and can be set to an arbitrary value.

As described above, according to the present embodiment, the image forming apparatus 100A is operated by the first electrical power storage device 310 and the second electrical power storage device 320 when the supply of the power from the commercial power supply 400 to the image forming apparatus 100A is stopped.

Further, according to the present embodiment, the output from the first electrical power storage device 310 is stopped and the image forming apparatus 100A is operated by the second electrical power storage device 320 when an operation or a job is not received for a predetermined time in a case where the supply source of the power of the image forming apparatus 100A is the first electrical power storage device 310.

Then, in the present embodiment, a predetermined job determined in advance is executed and use of most part of the functions of the image forming apparatus 100A is prohibited when the image forming apparatus 100A is operated by the second electrical power storage device 320.

Therefore, in the present embodiment, the consumption of the stored power of the electrical power storage device can be moderated and the consumption of the power can be suppressed in a case where the supply of the power from the commercial power supply 400 is stopped. Therefore, according to the present embodiment, the function that is of high importance and needs to be operated on a constant basis can be realized over a long period of time.

Note that, in the present embodiment, the supply source of the power has been switched to the first electrical power storage device 310 when the supply of the power from the commercial power supply 400 is stopped. However, an embodiment is not limited to the case. In the present embodiment, the supply source of the power may be switched to the first electrical power storage device 310 by the operation of a user or the like even in a state where the supply of the power from the commercial power supply 400 can be received.

Next, an operation of the operation device 500 of the present embodiment will be described referring to FIG. 15. FIG 15 is a flowchart illustrating an operation of the operation device of the second embodiment.

The operation device 500 of the image forming apparatus 100A of the present embodiment determines whether the operation on the operation panel 510 has been received by the state monitoring unit 520 (step S1501). When the operation has not been received in step S1501, the state monitoring unit 520 stands by.

When the operation has been received in step S1501, the state monitoring unit 520 determines whether the supply source of the power is the second electrical power storage device 320 (step S1502). A determination method may be a method of causing the state monitoring unit 520 to inquire of the state management unit 241A of the main device 200A about the supply source, or may be a method of causing the state monitoring unit 520 to hold the supply source notified from the state management unit 241A and to refer to the held supply source.

When the supply source is not the second electrical power storage device 320 in step S1502, the operation device 500 displays a UI according to the operation (step S1503), and terminates the processing.

When the supply source is the second electrical power storage device 320 in step S1502, the state monitoring unit 520 determines whether the power has been supplied to the operation panel 510 (step S1504). In other words, the state monitoring unit 520 determines whether the operation panel 510 has been started.

When the operation panel 510 has not been started in step S1504, the state monitoring unit 520 stands by until the operation panel 510 is started.

When the operation panel 510 has been started, that is, when the operation restriction application 504 is enabled in step S1504, the state monitoring unit 520 causes the operation restriction unit 530 to display the operation restriction screen on the operation panel 510 (step S1505), and terminates the processing.

As described above, according to the present embodiment, the operation device 500 displays the operation restriction screen that prohibits the operation on the operation panel 510 in a case where the supply source is the second electrical power storage device 320. Therefore, use of the functions of the image forming apparatus can be easily restricted.

In other words, in the present embodiment, the operation on the operation panel 510 in a case where the supply source is the second electrical power storage device 320 is an operation to instruct start of the operation panel 510 (first operation). Further, in the present embodiment, the operation device 500 displays the operation restriction screen that prohibits reception of another operation (second operation), when the operation device 500 receives the instruction of start of the operation panel 510 in a case where the supply source is the second electrical power storage device 320.

That is, in the present embodiment, the operation restriction screen that prohibits reception of the operation to the image processing device 295A is displayed on the operation panel 510 after start, when the operation to start the operation panel 510 is received in a case where the supply source is the second electrical power storage device 320.

With the configuration, in the present embodiment, processing of causing each application to determine a state of electric conduction and to prepare a screen according to the state, and to restrict a function common in a system, in displaying a special screen for function restriction, is not required.

Therefore, according to the present embodiment, use of the functions can be easily restricted even if the number of applications is large. Further, according to the present embodiment, troublesome work such as revision of a general-purpose OS is not required, and use of the functions can be easily restricted.

Note that the operation device 500 of the present embodiment may display information regarding received fax data on the operation restriction screen.

FIG. 16 is a diagram illustrating another example of a screen displayed on the operation panel. On an operation restriction screen 415A illustrated in FIG. 16, information 418 regarding received fax data is displayed in addition to the message 416 that prompts switching of the supply source to the first electrical power storage device 310, and the button 417 for turning off the power supply of the image forming apparatus 100A.

The information 418 is a list of the received fax data, and includes reception time, a transmission source, and the number of pages as items. The item "reception time" indicates time when the fax data is received, the transmission source indicates a transmission source of the fax data, and the number of pages indicates the number of pages of the received fax data.

Note that the information 418 may be notified from the main device 200A to the operation device 500 as accumulation document information every time the main device 200A receives the fax data, for example. The operation device 500 accumulates the accumulation document information notified from the main device 200A, and may display the accumulation document information when displaying the operation restriction screen.

Further, the operation device 500 of the present embodiment may acquire a list of the accumulation document information accumulated in the main device 200A and display the list when displaying the operation restriction screen on the operation panel 510.

The information 418 is displayed on the operation restriction screen 415A. Therefore, the user can grasp details of the received fax data.

Further, in the present embodiment, the entire image forming apparatus 100A is shut down by an operation on the button 417 displayed by the operation restriction application 504. That is, in the present embodiment, the entire image forming apparatus 100A can be shut down by the operation restriction application 504.

Note that FIG. 16 illustrates an example in which the information 418 regarding the received fax data is displayed. However, an embodiment is not limited to the example. Information indicating a list of received print jobs may be displayed on the operation restriction screen of the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus, comprising:
an image processing device to perform processing, using electrical power supplied from a supply source, the supply source being selected from a commercial power supply, a first electrical power storage device, and a second electrical power storage device, the second electric power storage device having a capacity to supply electric power in an amount smaller than an amount supplied from the first electric power storage device; and
circuitry to control the processing to be performed by the image processing device according to the selected supply source,
wherein, when the supply source is the first electrical power storage device, the circuitry controls the image processing device to execute processing that is executable when the supply source is the commercial power supply, and
when the supply source is the second electrical power storage device, the circuitry controls the image processing device to execute a part of the processing that is executable when the supply source is the commercial power supply.

2. The image forming apparatus according to claim 1,
wherein the circuitry monitors whether a print job comprising data to be printed is received from a network, the data to be printed including at least one of facsimile data and print data, and
when the data to be printed is received when the supply source is the second electric power storage device,
the circuitry controls the image processing device to store the received data to be printed without executing printing based on the received data to be printed.

3. The image forming apparatus according to claim 2,
wherein the image forming apparatus operates in one of a plurality of modes, the plurality of modes including:
a job mode in which the image processing device executes printing;
a standby mode in which the image processing device is ready to start execution of printing;
an engine off mode in which the image processing device is controlled to store the data to be printed in a memory without executing the print job; and
a suspend mode in which the image processing device stops operation, except to monitor reception of the data to be printed from a network,
wherein, in response to receiving the data to be printed in the standby mode,
the image processing device is transitioned to the job mode to execute printing of the data, when the supply source is one of the commercial power supply and the first electrical power storage device, and
the image processing device is transitioned to the engine off mode to store the data without executing printing, when the supply source is the second electrical power storage device.

4. The image forming apparatus according to claim 3,
wherein the first electrical power storage device supplies the electric power to the image processing device via the second electrical power storage device to charge the second electric power storage device, and
wherein, when the image forming apparatus is transitioned to the suspend mode, the circuitry switches the supply source from the first electrical power storage device to the second electrical power storage device.

5. The image forming apparatus according to claim 1,
wherein, in response to detecting stop of supply from the commercial power supply, the circuitry switches the supply source from the commercial power supply to the first electrical power storage device, and
when an operation has not been performed for a predetermined time after the supply source is switched to the first electrical power storage device, the circuitry further switches the supply source to the second electrical power storage device.

6. The image forming apparatus according to claim 1, further comprising:
an operation device to receive an operation or output information from or to a user,
wherein the circuitry stops an operation of the operation device when the supply source is switched from the first electrical power storage device to the second electrical power storage device.

7. The image forming apparatus according to claim 6,
wherein, when the circuitry receives an operation to start the operation device after the supply source is switched from the first electrical power storage device to the second electrical power storage device,
the circuitry controls the operation device to display an operation restriction screen that prevents the user from inputting an operation.

8. The image forming apparatus according to claim 7,
wherein the operation restriction screen includes information indicating a list of received fax data.

9. The image forming apparatus according to claim 8,
wherein, when an operation on the operation device is received while the supply source is the second electrical power storage device,
the circuitry controls the operation device to start displaying the operation restriction screen, the operation restriction screen including a message indicating that the received data can be printed by executing the first electrical power storage device.

10. The image forming apparatus according to claim 7, wherein
in response to a notification indicating that the supply source is switched from the first electrical power storage device to the second electrical power storage device from the circuitry,
the operation device generates the operation restriction screen, and displays the operation restriction screen on a top layer when an operation on the display operation device is received.

11. The image forming apparatus according to claim 6,
wherein, when supply of the power from the commercial power supply is stopped, the circuitry switches the supply source to the first electrical power storage device, and
when an operation on the operation device has not been performed for a predetermined time after the supply source is switched to the first electrical power storage device, the circuitry further switches the supply source from the first electrical power storage device to the second electrical power storage device.

12. The image forming apparatus according to claim 6,
wherein the circuitry notifies the operation device that a part of the processing is executable.

13. An image forming system, comprising:
an image processing device to perform processing, using electrical power supplied from a supply source, the supply source being selected from a commercial power supply, a first electrical power storage device, and a second electrical power storage device, the second electric power storage device supplying electric power in an amount smaller than an amount supplied from the first electric power storage device; and circuitry to control the processing to be performed by the image processing device according to the selected supply source, wherein, when the supply source is the first electrical power storage device, the circuitry controls the image processing device to execute processing that is executable when the supply source is the commercial power supply, and when the supply source is the second electrical power storage device, the circuitry controls the image processing device to execute a part of the processing that is executable when the supply source is the commercial power supply.

14. An image forming method, comprising:

selecting a supply source that supplies electric power to an image processing device, from a commercial power supply, a first electrical power storage device, and a second electrical power storage device, the second electric power storage device supplying electric power in an amount smaller than an amount supplied from the first electric power storage device; and controlling processing to be performed by an image processing device according to the selected supply source, wherein, when the supply source is the first electrical power storage device, the controlling includes controlling the image processing device to execute processing that is executable when the supply source is the commercial power supply, and when the supply source is the second electrical power storage device, the controlling the image processing device to execute a part of the processing that is executable when the supply source is the commercial power supply.

* * * * *